United States Patent
Ueda et al.

(10) Patent No.: US 6,525,770 B1
(45) Date of Patent: Feb. 25, 2003

(54) IMAGE PICKUP DEVICE AND METHOD, IMAGE PICKUP SYSTEM, IMAGE INFORMATION PROVIDING DEVICE AND METHOD, VIDEO DATA PROCESSING DEVICE AND METHOD, AND TRANSMISSION MEDIUM

(75) Inventors: Kuzuhiko Ueda; Takeshi Kubozono, both of Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/015,786

(22) Filed: Jan. 29, 1998

(30) Foreign Application Priority Data

Jan. 31, 1997 (JP) .............................................. 9-018075
Nov. 13, 1997 (JP) .............................................. 9-312397

(51) Int. Cl.$^7$ ............................................... H04N 5/335
(52) U.S. Cl. ........................ 348/316; 348/312; 348/222
(58) Field of Search ................................. 348/207, 208, 348/219, 294, 295, 296, 297, 298, 311, 312, 315, 316, 317, 322, 320, 86, 87, 91, 92, 94, 95, 222; H04N 5/335

(56) References Cited

U.S. PATENT DOCUMENTS 5,155,597 * 10/1992 Lareau et al. ................ 348/311
5,668,593 * 9/1997 Lareau et al. ................ 348/146
6,211,910 * 4/2001 Kino et al. .................... 348/208

FOREIGN PATENT DOCUMENTS

EP          0369585          5/1990

* cited by examiner

Primary Examiner—Tuan Ho
(74) Attorney, Agent, or Firm—Ronald P. Kananen, Esq.; Rader, Fishman, & Grauer, PLLC

(57) ABSTRACT

The initial value T0 of the period of a four-phase driving signal for driving a CCD of an image pickup device is calculated according to the equation T0=(L×p)/(f×v). Wherein, L represents the distance from the CCD to a product (object), if represents the focus length of the optical system used between the CCD and product, v represents the transferring speed of the product, and p represents the distance interval of photodiodes of the CCD. Afterward, the period T of the driving signal is adjusted properly depending on the pickup position of the product. Because electric charges corresponding to the same portion of the image of the product are accumulated in the same potential well formed by the driving signal by generating the driving signal as described above, the image of the product is picked up with suppressed blurring regardless of the speed of the product. Blurring is prevented during image pickup of an transferring object by the method described above.

7 Claims, 31 Drawing Sheets

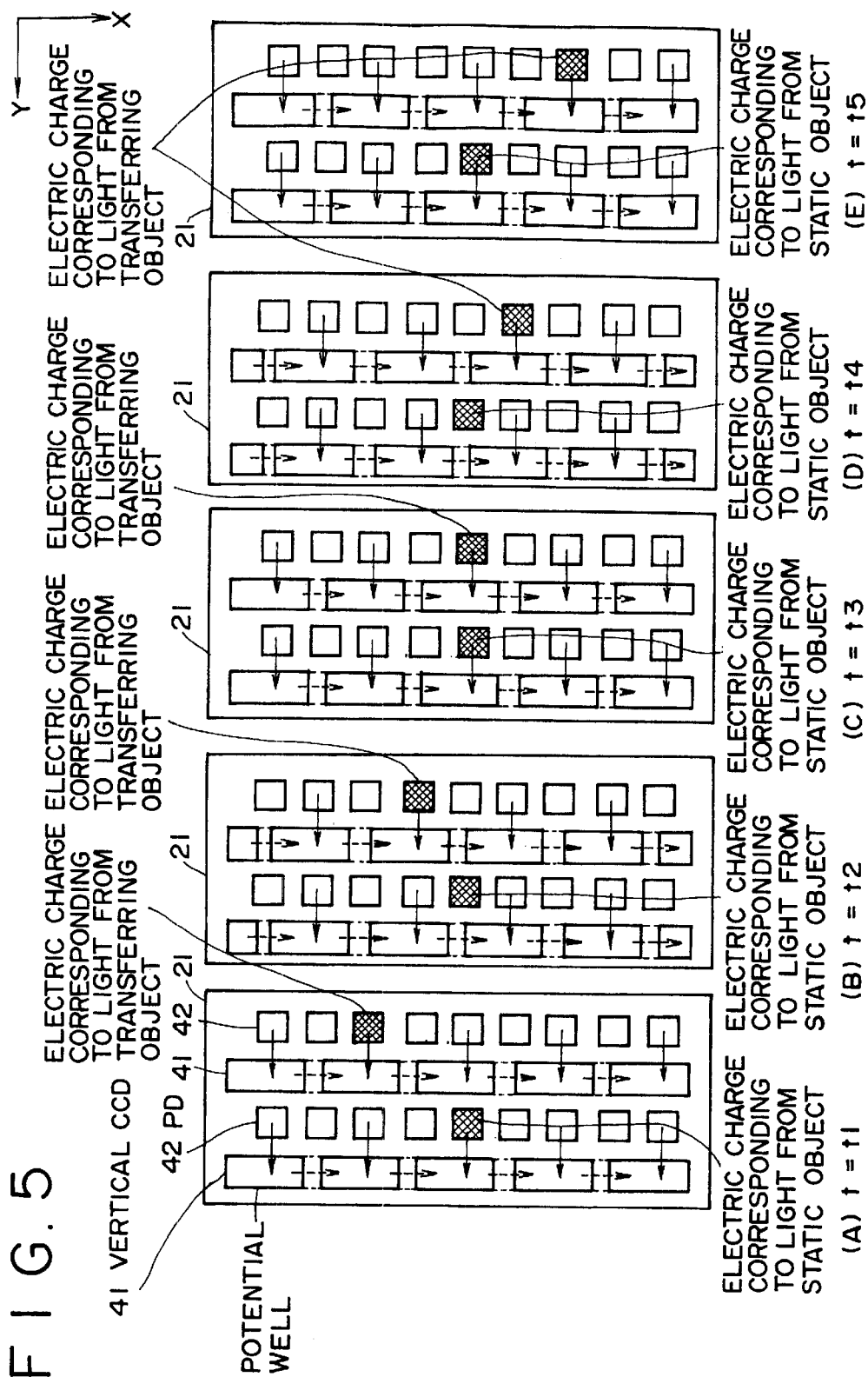

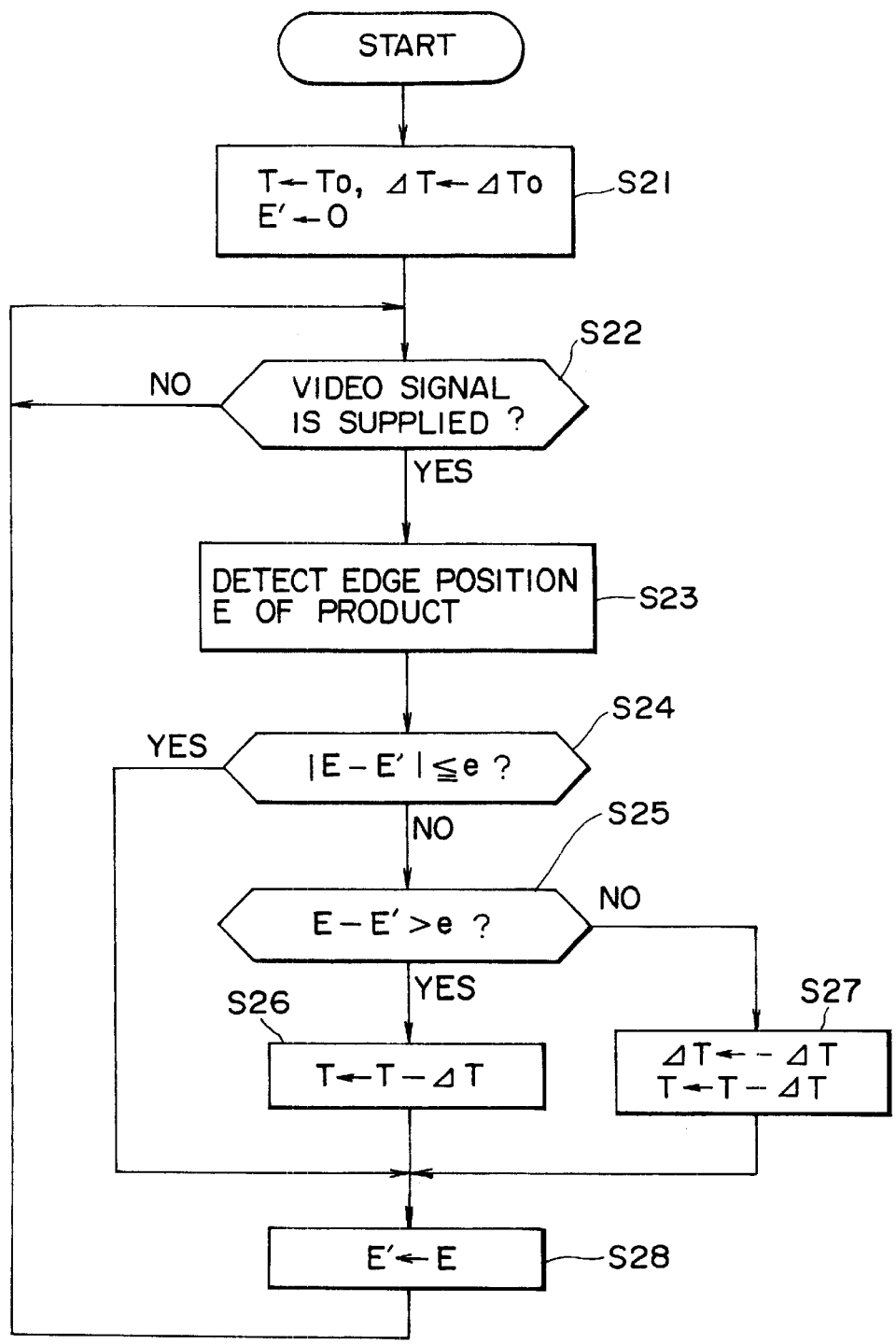

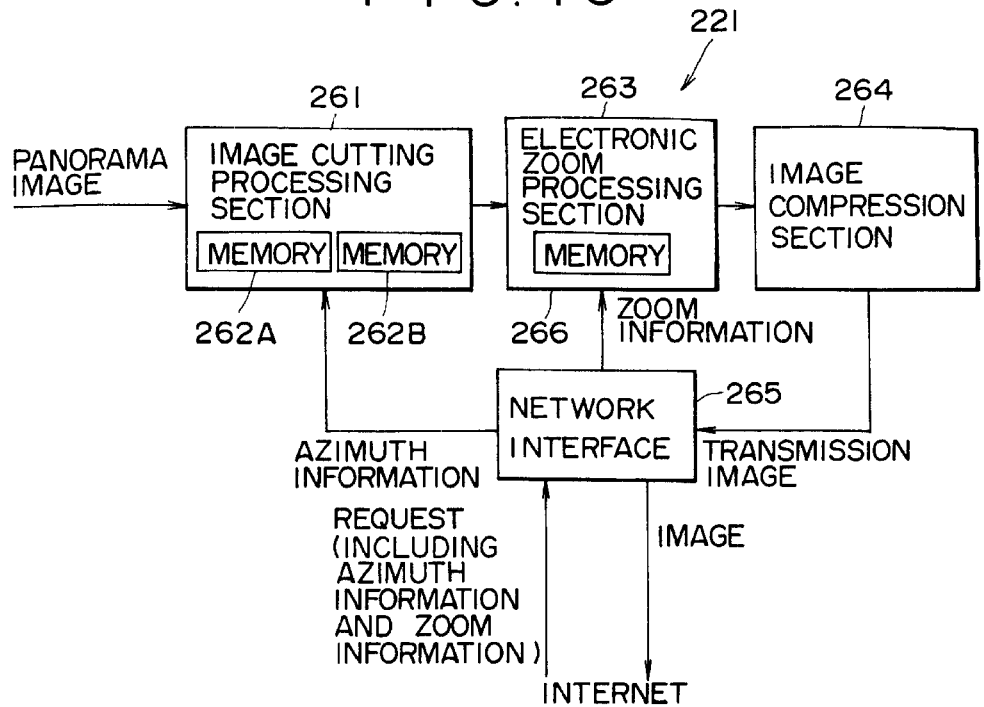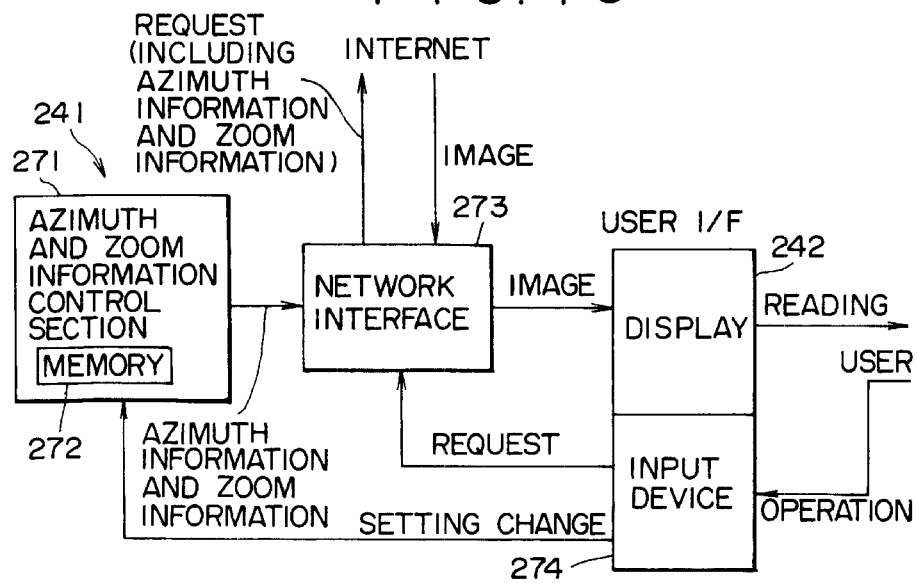

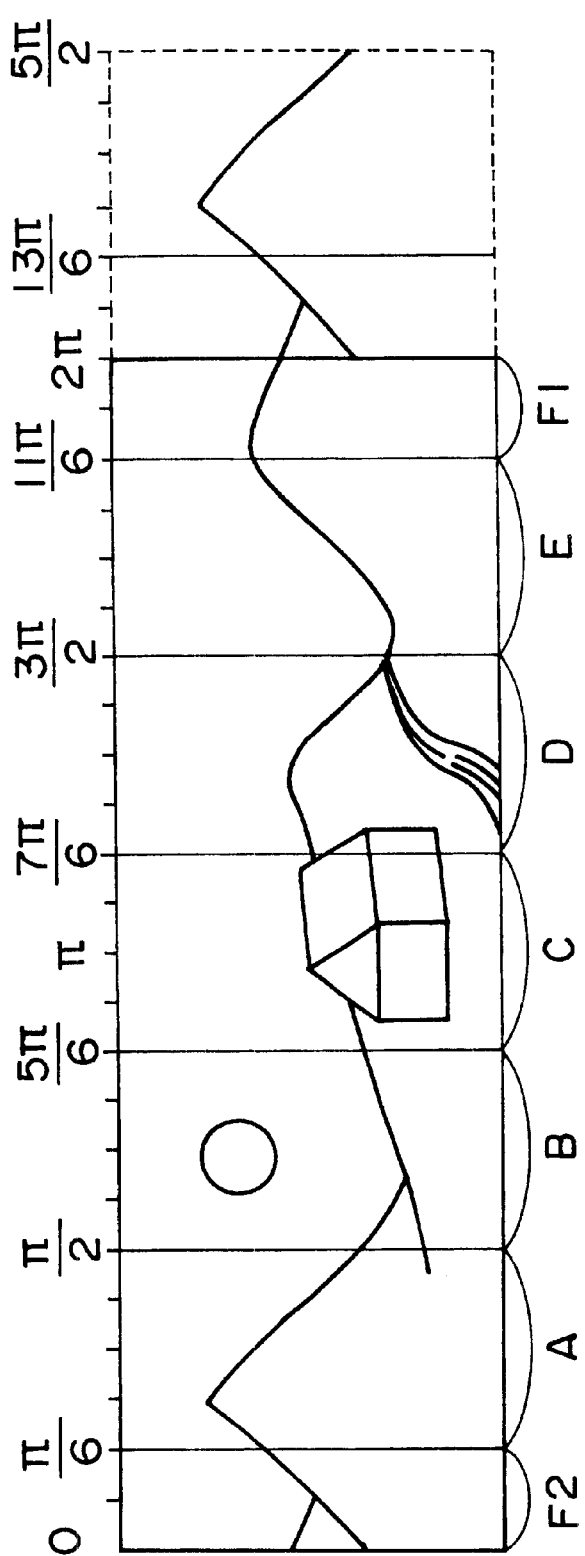

F I G. 23A 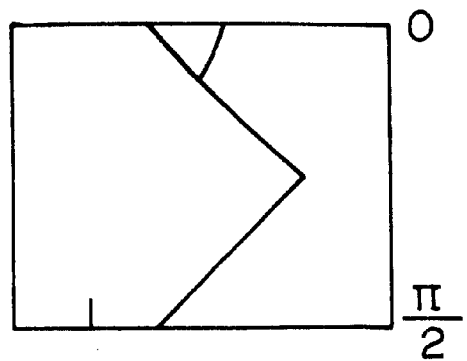
F I G. 23B 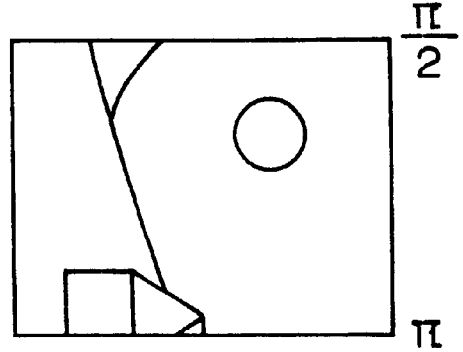
F I G. 23C 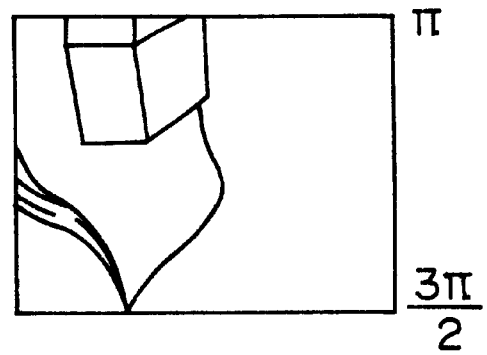
F I G. 23D 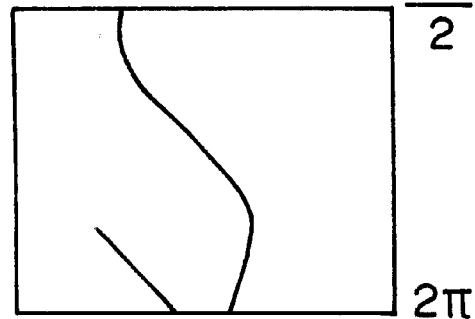

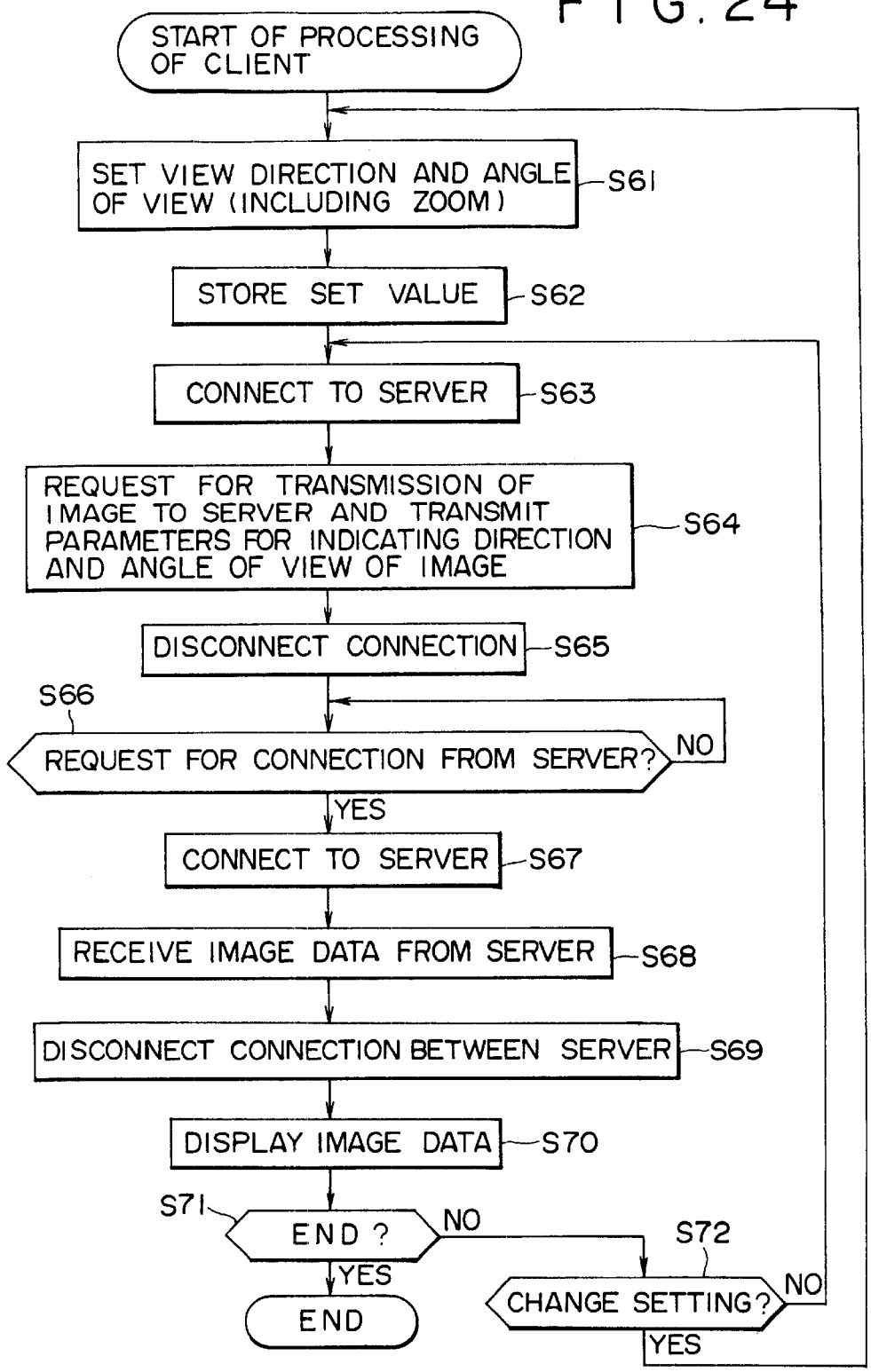

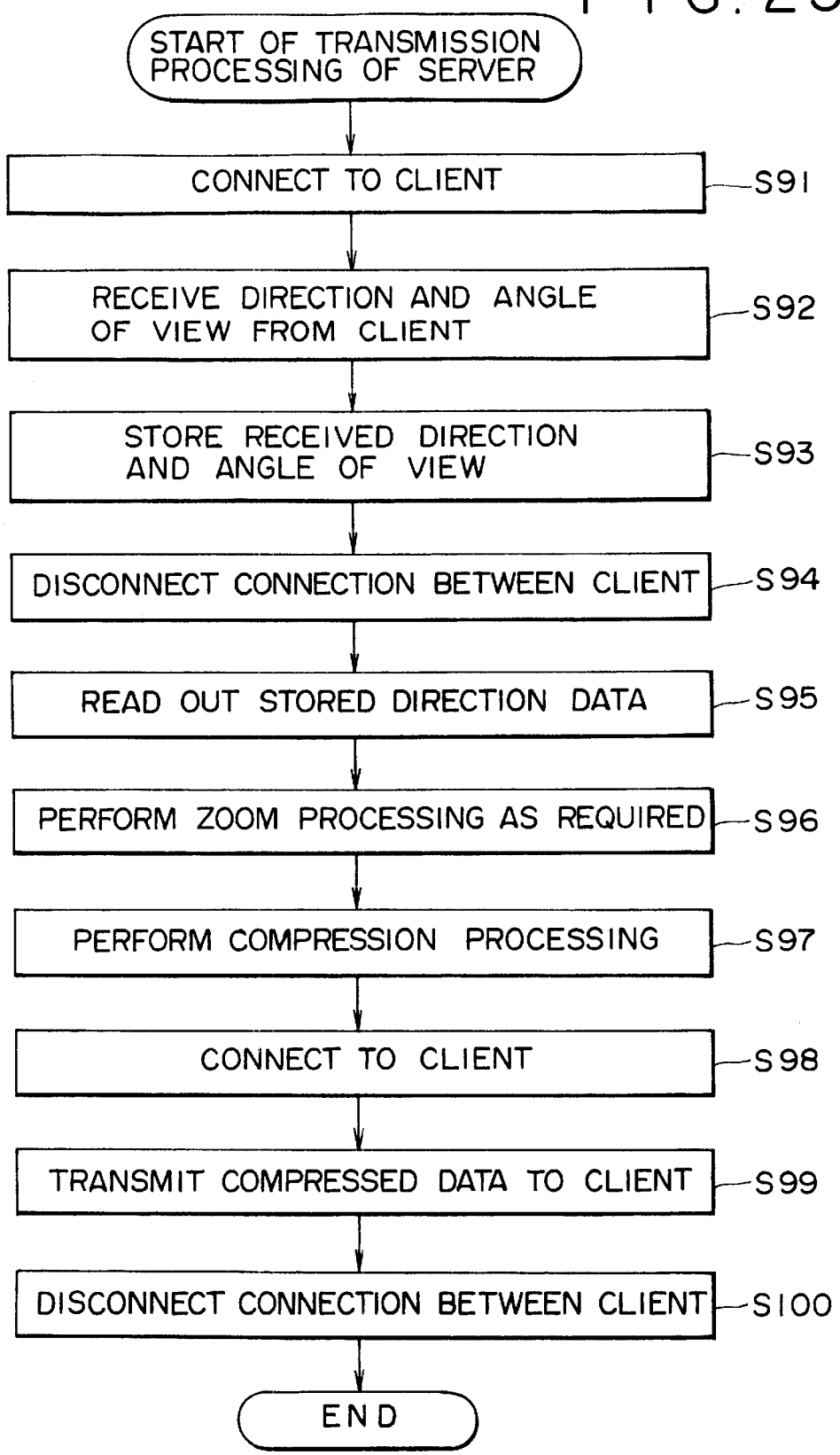

FIG. 28A

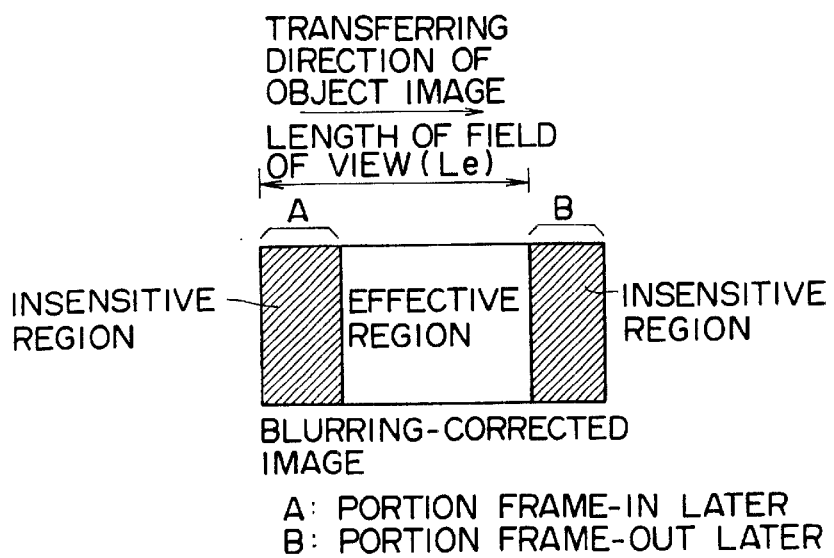

TRANSFERRING DIRECTION OF OBJECT IMAGE →

LENGTH OF FIELD OF VIEW (Le)

INSENSITIVE REGION — EFFECTIVE REGION — INSENSITIVE REGION

BLURRING-CORRECTED IMAGE

A: PORTION FRAME-IN LATER
B: PORTION FRAME-OUT LATER

FIG. 28B

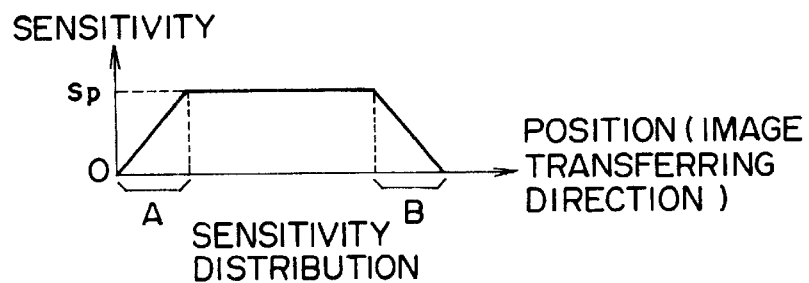

SENSITIVITY DISTRIBUTION

POSITION (IMAGE TRANSFERRING DIRECTION)

FIG. 29

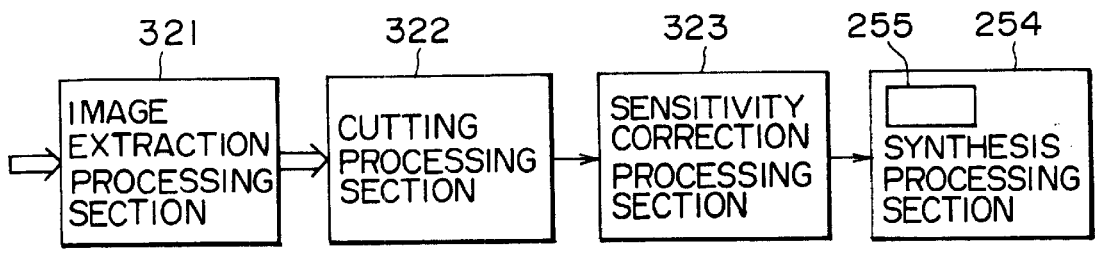

321 IMAGE EXTRACTION PROCESSING SECTION → 322 CUTTING PROCESSING SECTION → 323 SENSITIVITY CORRECTION PROCESSING SECTION → 255 / 254 SYNTHESIS PROCESSING SECTION

IMAGE PICKUP DEVICE AND METHOD, IMAGE PICKUP SYSTEM, IMAGE INFORMATION PROVIDING DEVICE AND METHOD, VIDEO DATA PROCESSING DEVICE AND METHOD, AND TRANSMISSION MEDIUM

BACKGROUND OF THE INVENTION

Description of Related Art

It has been widely used that, in a FA (Factory Automation) manufacturing process, for example, the image of objects (products) which are transferring on a belt conveyer is picked up using an image pickup device to identify the condition of objects by processing the image of the objects.

However, it is difficult to pick up a defined image because of movement of objects in the case that objects are moved very fast on a belt conveyer.

For example, as shown in FIG. 34A, in the case of an object of triangle (A in the drawing) in view from an image pickup device, movement of the object causes the image pickup device to pick up the object as, for example, a pentagon, and it is difficult to identify the condition of the object correctly.

To cope with such a problem, various methods, in which an image is picked up after the object is brought to a stop, an image is picked up in a moment under irradiation of the light from a stroboscope in a dark atmosphere, or an image is picked up in a very short exposure time using an electronic shutter of the image pickup device, have been used.

However, in the case that an image is picked up after an object is brought to a stop, this method is disadvantageous in that a mechanism for stopping the belt conveyer in the field of view of the image pickup device is required, the requirement results in difficulty in cost reduction, and additionally productivity is reduced because objects are brought to a stop. In the case that an image is picked up in a moment under irradiation of the light from a stroboscope in a dark atmosphere, this method is disadvantageous in that a shade curtain is required to darken the atmosphere, and the requirement results in difficulty in cost reduction and additionally it is required to irradiate the object with the light so that an image of the object is picked up in good condition. Further in the case that an image is picked up in a very short exposure time using an electronic shutter of the image pickup device, this method is also disadvantageous in that a highly sensitive image pickup device or a high illumination lighting system is required because quantity of light obtained from the object decreases in proportion to the exposure time and the requirement results in difficulty in cost reduction. In addition, in the case that a high illumination lighting system is used, such lighting system can cause smearing.

The present invention is accomplished in view of such problems, it is the object of the present invention to prevent an image from being blurred when an image of an object is picked up without using a highly sensitive image pickup device and without using a high illumination lighting system by applying a method in which electric charge is outputted from an photoelectric transducer with a period figured out by dividing the distance interval (pitch) of a plurality of photoelectric transducers arranged in parallel to the transferring direction of the object by speed of an image of the object projected on the plurality of photoelectric transducers, the electric charge is superimposed on the electric charge accumulated at the position corresponding to the photoelectric transducer and the electric charge is moved at the same speed as that of the image of the object.

SUMMARY OF THE INVENTION

The image pickup device described in claim 1 is provided with a plurality of photoelectric conversion means arranged in the prescribed direction for converting the incident light photoelectrically to generate electric charge, an electric charge transfer means for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the photoelectric conversion means, a driving means for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object, and a processing means for processing electric charge transferred from the electric charge transfer means.

The image pickup method described in claim 5 comprises a step for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the photoelectric conversion means, a step for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object, and a step for processing electric charge transferred from the electric charge transfer means.

The transmission medium described in claim 6 comprises a step for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the photoelectric conversion means, a step for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object, and a step for processing electric charge transferred from the electric charge transfer means.

The image pickup system described in claim 7 is provided with a transfer means for transferring an object in a prescribed direction, a detection means for detecting the position of the object, a plurality of photoelectric conversion means arranged in the prescribed direction for converting the incident light photoelectrically to generate electric charge, an electric charge transfer means for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the plurality of photoelectric conversion means, a driving means for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object depending on the position of the object detected by means of the detection means, the first processing means for processing electric charge transferred from the electric charge transfer means and generating an image signal, and the second processing means for processing the image signal generated by the first processing means.

The image information providing device is provided with an image pickup means for panning image picking up an object, a transferring means for transferring the image pickup means relatively to the object, a synthesis means for synthesizing image data of the object picked up by means of the image pickup means at different timing, a memory means for storing an image data synthesized by means of the synthesis means, a reception means for receiving an indication information for indicating a reading range from the image data stored in the memory means, and an output means for reading out the image data of the range corresponding to the indication information received by the reception means from the memory means and outputting the image data.

The image information providing method comprises an image pickup step for panning image picking up an object using an image pickup section, a transferring step for transferring the image pickup section relatively to the object, a synthesis step for synthesizing image data of the object picked up in the image pickup step at different timing, a memory step for storing an image data synthesized in the synthesis step, a reception step for receiving an indication information for indicating a reading range from the image data stored in the memory step, and an output step for reading out the image data of the range corresponding to the indication information received in the reception step from image data stored in the memory step and outputting the image data.

The transmission medium comprises an image pickup step for panning image picking up an object using an image pickup section, a transferring step for transferring the image pickup section relatively to the object, a synthesis step for synthesizing image data of the object picked up in the image pickup step at different timing, a memory step for storing an image data synthesized in the synthesis step, a reception step for receiving an indication information for indicating a reading range from the image data stored in the memory step, and an output step for reading out the image data of the range corresponding to the indication information received in the reception step from image data stored in the memory step and outputting the image data.

The image data processing device is provided with an image pickup means for panning picking up an object with an prescribed angle of view, a transfer means for transferring the image pickup means at a prescribed speed relatively to the object, an extraction means for extracting the effective region specified by the angle of view of the image pickup means and the speed of the transfer means out of the image data of the object picked up at a prescribed timing by means of the image pickup means, a synthesis means for synthesizing image data of the effective region extracted by means of the extraction means, and a memory means for storing the image data synthesized by means of the synthesis means.

The image data processing method comprises an image pickup step for panning picking up an object with an prescribed angle of view by means of an image pickup section, a transfer step for transferring the image pickup section at a prescribed speed relatively to the object, an extraction step for extracting the effective region specified by the angle of view of the image pickup section and the speed in the transfer step out of the image data of the object picked up at a prescribed timing in the image pickup step, a synthesis step for synthesizing image data of the effective region extracted in the extraction step, and a memory step for storing the image data synthesized in the synthesis step.

The transmission medium comprises an image pickup step for panning picking up an object with an prescribed angle of view by means of an image pickup section, a transfer step for transferring the image pickup section at a prescribed speed relatively to the object, an extraction step for extracting the effective region specified by the angle of view of the image pickup section and the speed in the transfer step out of the image data of the object picked up at a prescribed timing in the image pickup step, a synthesis step for synthesizing image data of the effective region extracted in the extraction step, and a memory step for storing the image data synthesized in the synthesis step.

The image data processing is provided with an image pickup means for panning picking up an object with a prescribed angle of view, a transfer means for transferring the image pickup means at a prescribed speed relatively to the object, a correction means for extracting the second region which is a portion of the second image data of the object picked up at the second timing by means of the image pickup means corresponding to the first region which is a portion of the first image data of the object picked up at the first timing by means of the image pickup means, and correcting the sensitivity, a synthesis means for synthesizing one image by combining the image data of the first region and second region corrected by means of the correction means, the image data of the third region excepting the first region of the first image data, and the image data of the fourth region excepting the second region of the second image data, and a memory means for storing the image data synthesized by means of the synthesis means.

The image data processing method comprises an image pickup step for panning picking up an object with a prescribed angle of view by means of image pickup section, a transfer means for transferring the image pickup section at a prescribed speed relatively to the object, a correction step for extracting the second region which is a portion of the second image data of the object picked up at the second timing by means of the image pickup section corresponding to the first region which is a portion of the first image data of the object picked up at the first timing by means of the image pickup section, and correcting the sensitivity, a synthesis step for synthesizing one image by combining the image data of the first region and second region corrected in the correction step, the image data of the third region excepting the first region of the first image data, and the image data of the fourth region excepting the second region of the second image data, and a memory step for storing the image data synthesized in the synthesis step.

The transmission medium comprises an image pickup step for panning picking up an object with a prescribed angle of view by means of image pickup section, a transfer means for transferring the image pickup section at a prescribed speed relatively to the object, a correction step for extracting the second region which is a portion of the second image data of the object picked up at the second timing by means of the image pickup section corresponding to the first region which is a portion of the first image data of the object picked up at the first timing by means of the image pickup section, and correcting the sensitivity, a synthesis step for synthesizing one image by combining the image data of the first region and second region corrected in the correction step, the image data of the third region excepting the first region of the first image data, and the image data of the fourth region excepting the second region of the second image data, and a memory step for storing the image data synthesized in the synthesis step.

BRIEF DESCRIPTION OF THE DRAWINGS

FIG. 5 is a diagram for describing operation of the CCD shown in FIG. 2.

FIG. 7 is a flow chart for describing operation of the transfer period setting circuit shown in FIG. 2.

FIG. 15 is a block diagram for illustrating an exemplary structure of an Internet server shown in FIG. 13.

FIG. 16 is a block diagram for illustrating an exemplary structure of a client shown in FIG. 13.

FIG. 22 is a diagram for illustrating an example of the panorama image.

FIGS. 23A to 23D are diagrams for describing processing performed by the inversion processing section shown in FIG. 14.

FIG. 24 is a flow chart for describing operation of the client shown in FIG. 16.

FIG. 25 is a flow chart for describing operation of the Internet server shown in FIG. 15.

FIGS. 28A and 28B are diagrams for describing effective region and insensitive region.

FIG. 29 is a block diagram for illustrating another exemplary structure of an image processing device of the present invention.

DETAILED DESCRIPTION OF THE PREFERRED EMBODIMENTS

Figure 1:
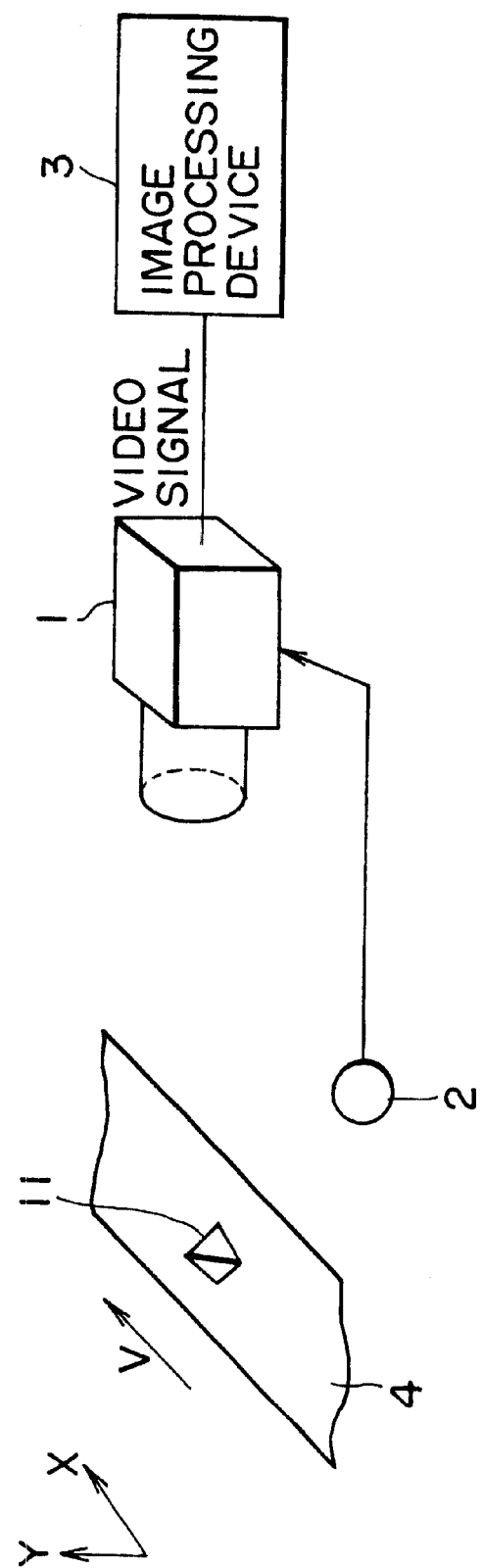
FIG. 1 is a perspective view for illustrating the structure of one embodiment of the image pickup system of the present invention.

Embodiments of the present invention will be described in detail hereinafter. To describe correlation between respective means of the invention described in claims to respective embodiments, features of the present invention is described with addition of corresponding embodiments (one example) herein under. However, the present invention is by no means limited by such description.

The image pickup device described in claim 1 is provided with a plurality of photoelectric conversion means (for example, photodiode 42 in FIG. 5) arranged in the prescribed direction for converting the incident light photoelectrically to generate electric charge, an electric charge transfer means (for example, vertical CCD 41 in FIG. 5) for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the photoelectric conversion means, a driving means (for example, CCD driving circuit 22 in FIG. 2) for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object, and a processing means (for example, signal processing circuit 23 in FIG. 2) for processing electric charge transferred from the electric charge transfer means.

The image pickup system described in claim 7 is provided with a transfer means (for example, belt conveyer 4 in FIG. 1) for transferring an object in a prescribed direction, a detection means (for example, sensor 2 in FIG. 1) for detecting the position of the object, a plurality of photoelectric conversion means (for example, photodiode 42 in FIG. 5) arranged in the prescribed direction for converting the incident light photoelectrically to generate electric charge, an electric charge transfer means (for example, vertical CCD 41 in FIG. 5) for superimposing the electric charge outputted from the photoelectric conversion means on electric charge accumulated at the position corresponding to the photoelectric conversion means, and for transferring the electric charge in the prescribed direction at the same speed as the transferring speed in the prescribed direction of the image of the object projected on the plurality of photoelectric conversion means, a driving means (for example, CCD driving circuit 22 in FIG. 2) for outputting the electric charge from the photoelectric conversion means to the electric charge transfer means at a prescribed number of times with a period calculated by dividing the distance interval of the plurality of photoelectric conversion means by the transferring speed in the prescribed direction of the image of the object depending on the position of the object detected by means of the detection means, the first processing means (for example, signal processing circuit 23 in FIG. 2) for processing electric charge transferred from the electric charge transfer means and generating an image signal, and the second processing means (for example, image processing device 3 in FIG. 1) for processing the image signal generated by the first processing means.

The image information providing device is provided with an image pickup means (for example, image pickup device 1 in FIG. 13) for panning image picking up an object, a transferring means (for example, speed control motor 202 in FIG. 13) for transferring the image pickup means relatively to the object, a synthesis means (for example, synthesis processing section 254 in FIG. 14) for synthesizing image data of the object picked up by means of the image pickup means at different timing, a memory means (for example, memory 262A in FIG. 15) for storing an image data synthesized by means of the synthesis means, a reception means (for example, network interface 265 in FIG. 15) for receiving an indication information for indicating a reading range from the image data stored in the memory means, and an output means (for example, network interface 265 in FIG. 15) for reading out the image data of the range corresponding to the indication information received by the reception means from the memory means and outputting the image data.

Figure 13:
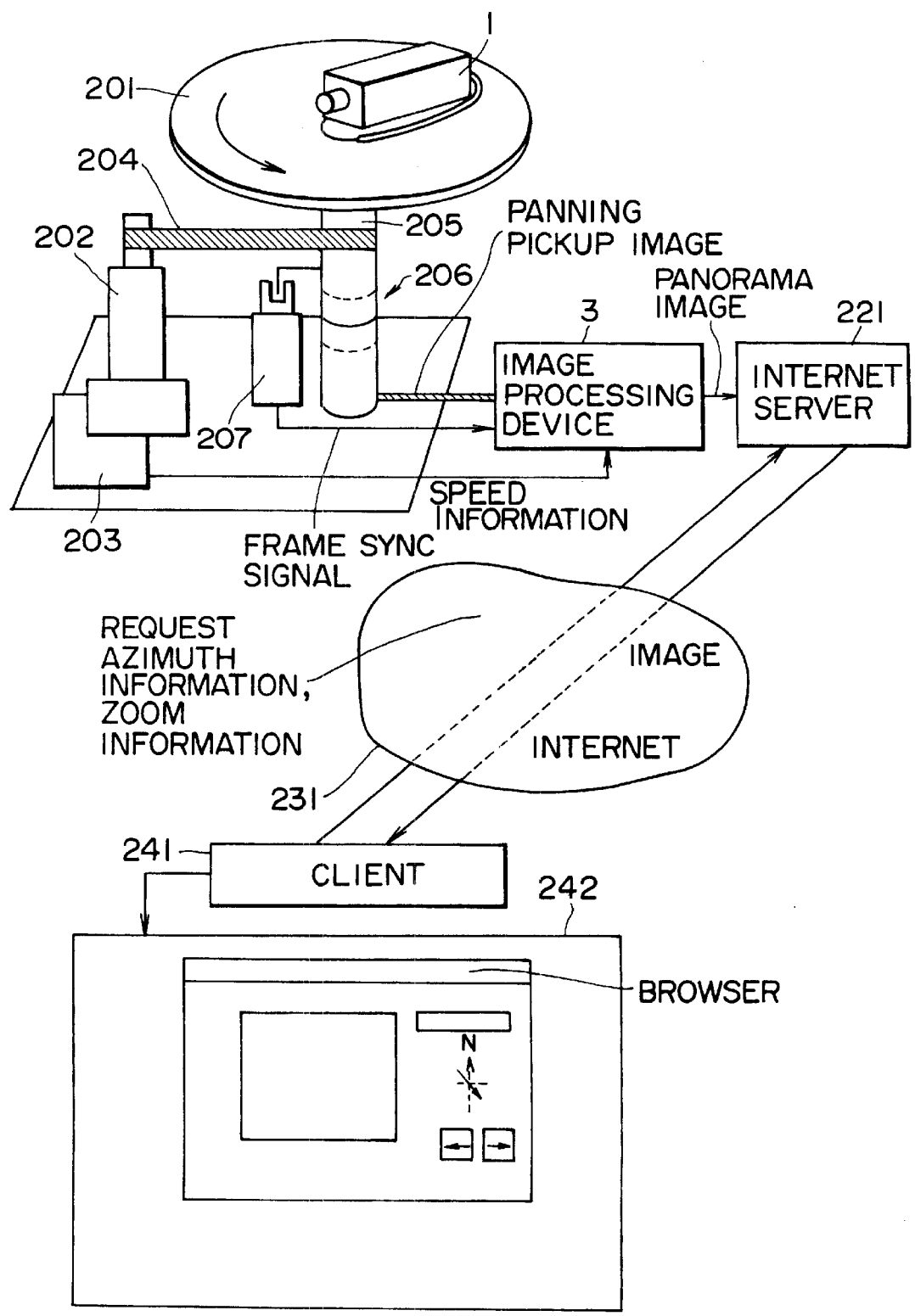
FIG. 13 is a block diagram for illustrating an exemplary structure of panorama image providing device to which the present invention is applied.
Figure 14:
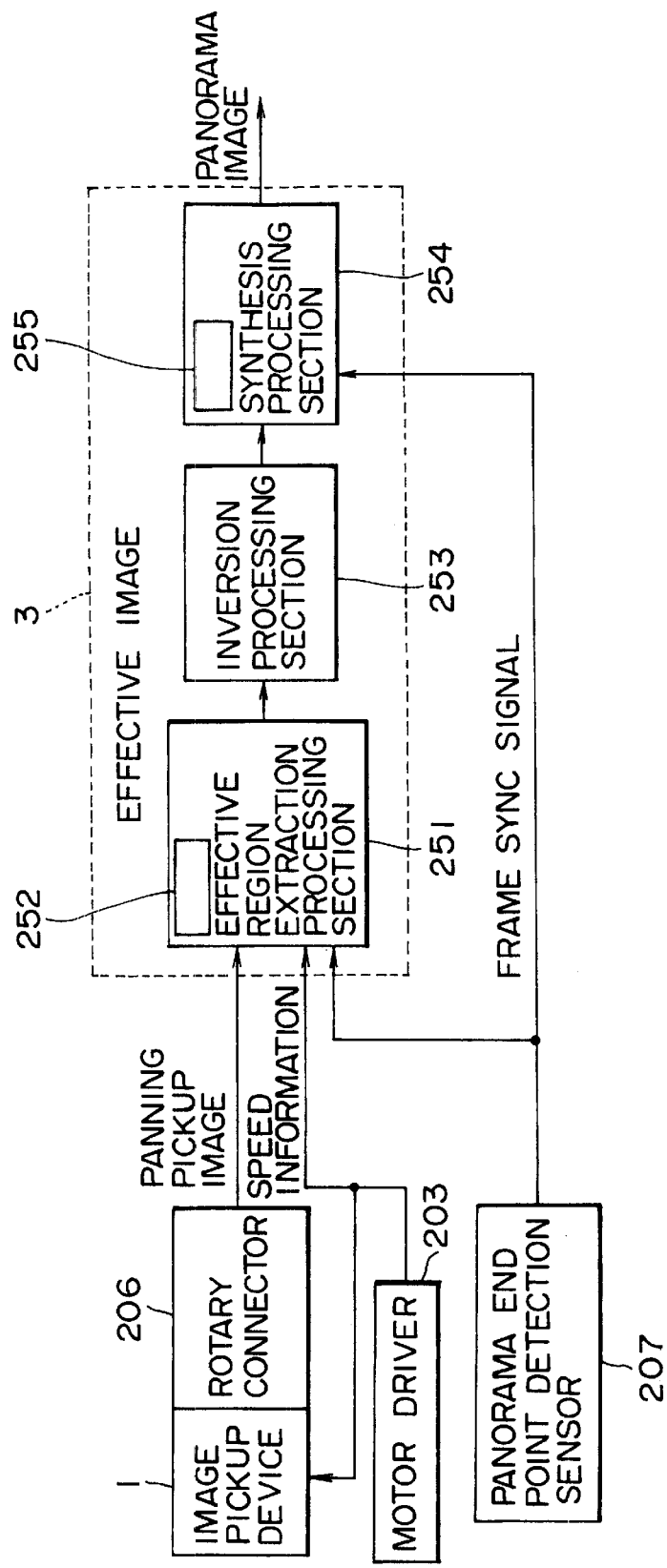
FIG. 14 is a block diagram for illustrating an exemplary structure of an image processing device shown in FIG. 13.

The image data processing device described in claim 13 is provided with an image pickup means (for example, image pickup device 1 in FIG. 13) for panning picking up an object with an prescribed angle of view, a transfer means (for example, speed control motor 202 in FIG. 13) for transferring the image pickup means at a prescribed speed relatively to the object, an extraction means (for example, effective region extraction processing section 251 in FIG. 14) for extracting the effective region specified by the angle of view of the image pickup means and the speed of the transfer means out of the image data of the object picked up at a prescribed timing by means of the image pickup means, a synthesis means (for example, synthesis processing section 254 in FIG. 14) for synthesizing image data of the effective region extracted by means of the extraction means, and a memory means (for example, frame memory 255 in FIG. 14) for storing the image data synthesized by means of the synthesis means.

The image data processing device described in claim 16 is provided with an image pickup means (for example, image pickup device 1 in FIG. 13) for panning picking up an object with a prescribed angle of view, a transfer means (for example, speed control motor 202 in FIG. 13) for transferring the image pickup means at a prescribed speed relatively to the object, a correction means (for example, sensitivity correction processing section 323 in FIG. 29) for extracting the second region which is a portion of the second image data of the object picked up at the second timing by means of the image pickup means corresponding to the first region which is a portion of the first image data of the object picked up at the first timing by means of the image pickup means, and correcting the sensitivity, a synthesis means (for example, synthesis processing section 254 in FIG. 29) for synthesizing one image by combining the image data of the first region and second region corrected by means of the correction means, the image data of the third region excepting the first region of the first image data, and the image data of the fourth region excepting the second region of the second image data, and a memory means (for example, frame memory 255 in FIG. 29) for storing the image data synthesized by means of the synthesis means.

FIG. 1 shows the structure of one embodiment of an image pickup system of the present invention. A belt conveyer 4 transfers a prescribed product (object) 11 in a prescribed direction (x-direction in the drawing) at a prescribed speed v.

A sensor 2 outputs a prescribed signal to an image pickup device 1 when the product 11 enters in the field of view (region to be picked up) of the image pickup device 1.

Upon receiving a prescribed signal supplied from the sensor 2, the image pickup device 1 which is one embodiment of the image pick up device of the present invention picks up the image of the product 11 (described hereinafter), and outputs the generated video signal to an image processing device 3. The image pickup device 1 is provided a built-in CCD (Charge Coupled Device) 21 (FIG. 2), the CCD 21 is disposed so that the vertical transfer path (vertical CCD 41 in FIG. 5) is arranged in x-direction.

The image processing device 3 judges the condition of the product 11 with reference to the video signal supplied from the image pickup device 1.

Figure 2:
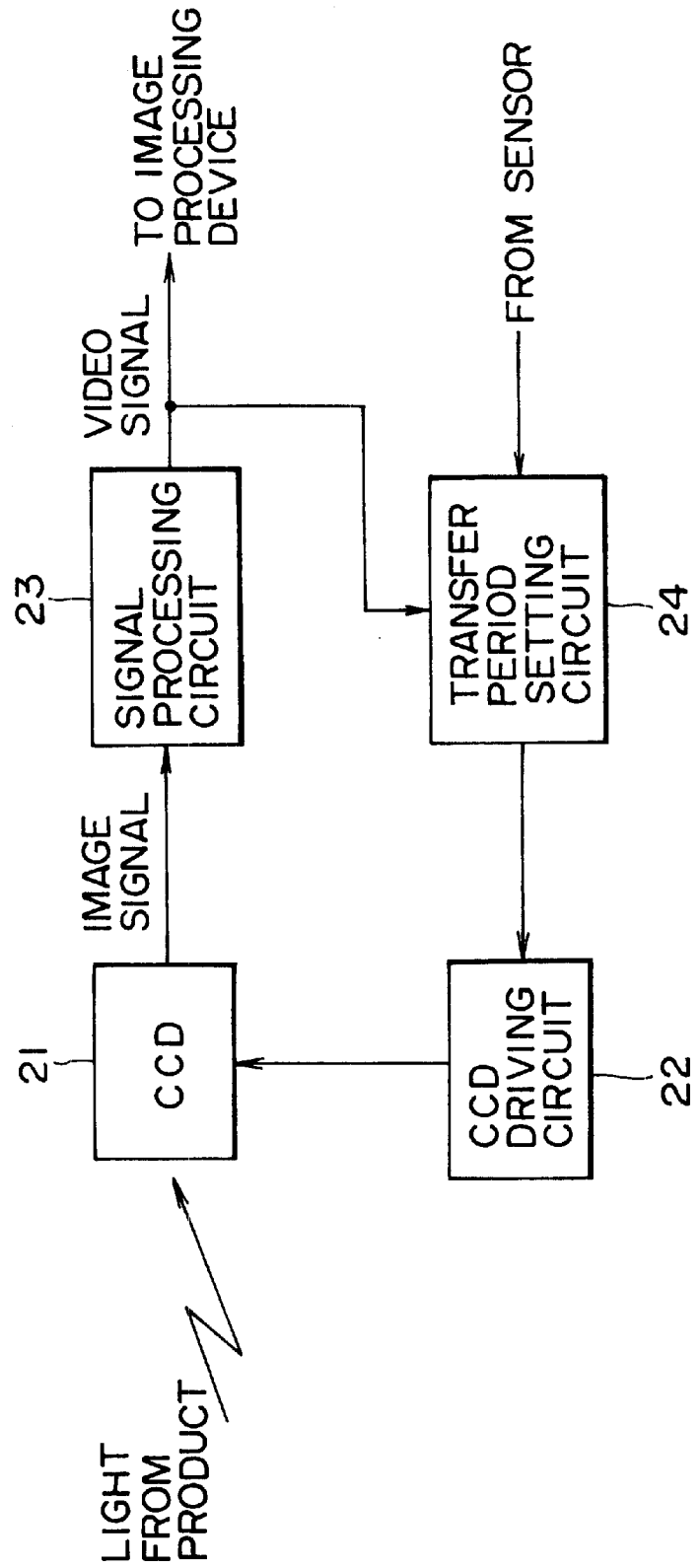
FIG. 2 is a block diagram for illustrating an exemplary structure of the image pickup device shown in FIG. 1.

FIG. 2 shows an exemplary structure of the image pickup device 1 shown in FIG. 1. The CCD 21 is provided with a plurality of photodiodes (PD) for the prescribed number of pixels (FIG. 5), and is operated in response to a four-phase driving signal having a prescribed period supplied from a CCD driving circuit 22, and then outputs electric charge (image signal) corresponding to the incident light to a signal processing circuit 23.

The signal processing circuit 23 converts the image signal supplied from the CCD 21 to a video signal of a prescribed standard, and outputs the video signal to the image processing device 3 and a transfer period setting circuit 24.

Upon receiving supply of the prescribed signal from the sensor 2, the transfer period setting circuit 24 outputs a re-start signal to the CCD driving circuit 22, discharges electric charge accumulated in the CCD 21, calculates a period (described hereinafter) used for outputting electric charge generated through photoelectric conversion in the CCD 21 based on the supplied video signal, and outputs the period to the CCD driving circuit 22.

The CCD driving circuit 22 generates a four-phase driving signal having a waveform corresponding to the period supplied from the transfer period setting circuit 24, supplies the signal to the CCD 21 during a prescribed time period, and then electric charge generated in the CCD 21 is outputted successively to the signal processing circuit 23 as the image signal.

Upon receiving supply of the re-start signal from the transfer period setting circuit 24, the CCD driving circuit 22 supplies a prescribed signal (reset signal in FIG. 4) to the CCD 21 to discharge the electric charge accumulated at that time in the CCD 21.

Figure 3:
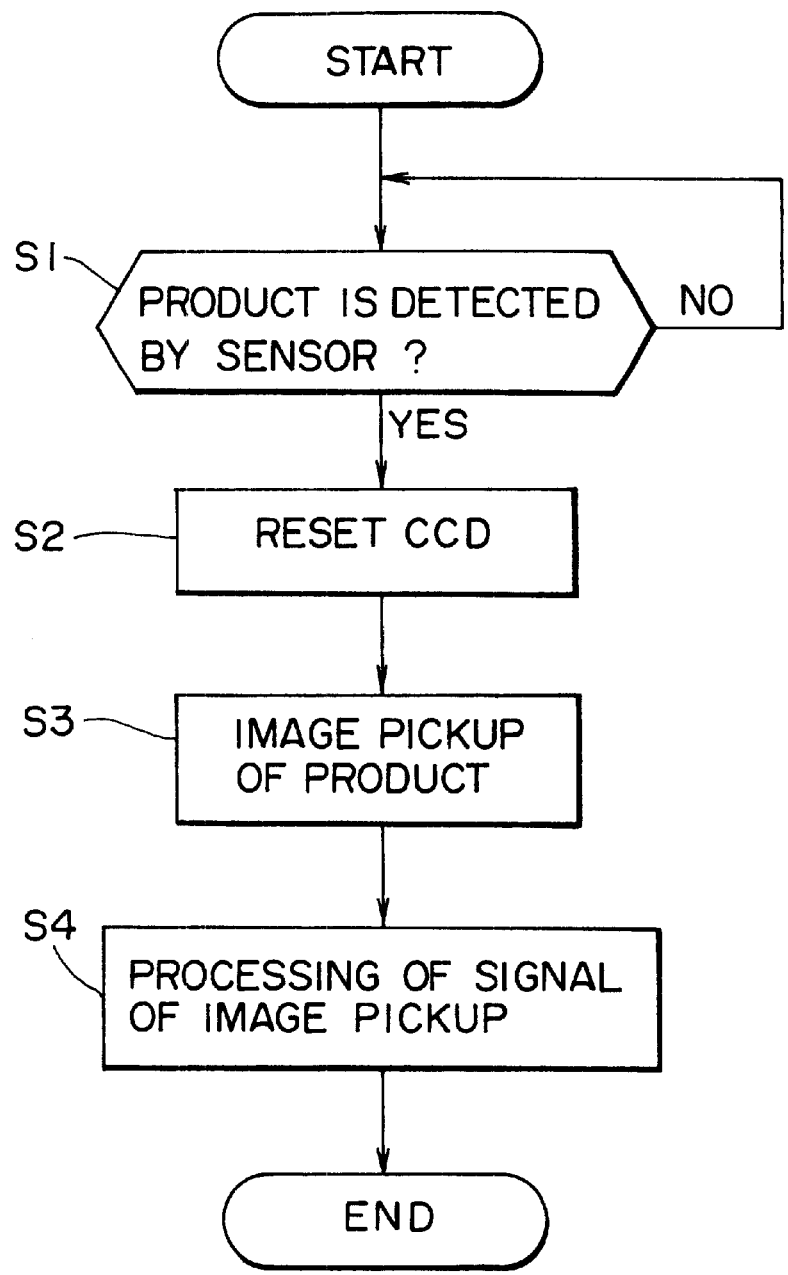
FIG. 3 is a flow chart for describing operation of the image pickup system shown in FIG. 1.

Next, operations of the image pickup system shown in FIG. 1 is described with reference to the flow chart shown in FIG. 3.

Figure 4:
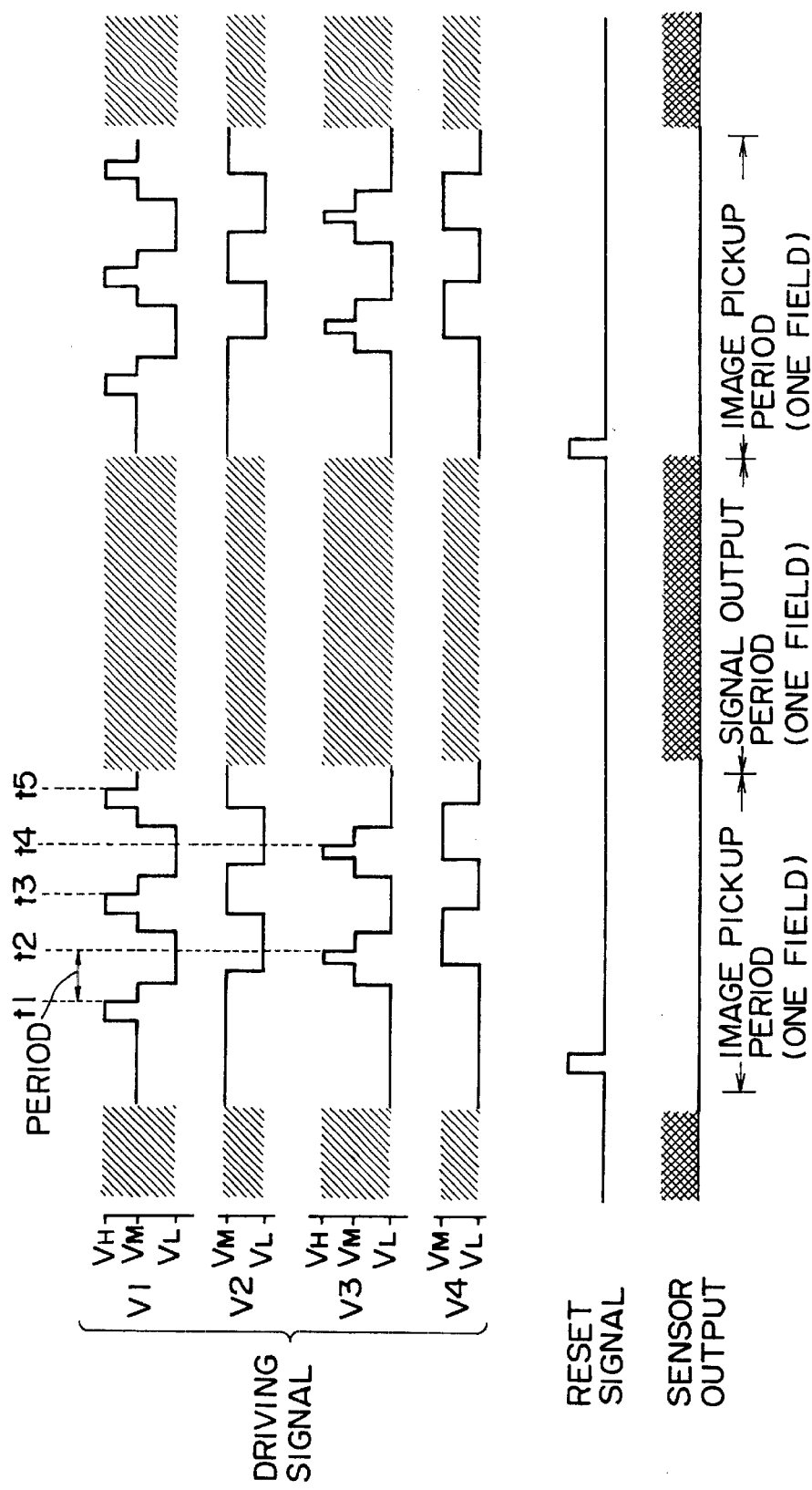
FIG. 4 is a timing chart for describing an example of the driving signal generated by a CCD driving circuit shown in FIG. 1.

First in the step S1, the image pickup system is waiting until the product 11 is detected at the prescribed position on the belt conveyer 4. When the sensor 2 detects the product 11 at the prescribed position, the sequence proceeds to the step S2, the transfer period setting circuit 24 outputs a re-start signal to the CCD driving circuit 22 as shown in FIG. 4, and outputs the period of driving signal of the CCD 21. When starting up, the transfer period setting circuit 24 outputs the predetermined initial value T0 of the period because a video signal is not yet supplied to the transfer period setting circuit 24.

The initial value T0 of the period is calculated previously by way of the procedure described herein under. First, the transfer speed v' of the product 11 on the CCD 21 is represented by the following equation.

$$v'=(f/L)\times v \tag{1}$$

In this equation, L represents the distance from the CCD 21 to the product 11, f represents the focal length of an optical system provided between the CD 21 and the product 11, and v represents the transfer speed of the product 11.

The initial value T0 of the period of the driving signal is calculated using the following equation.

$$T0=p/v'=(L\times p)/(f\times v) \tag{2}$$

Herein, p represents the distance interval of PD 42 (FIG. 5) of the CCD 21 (distance from the center of the one PD 42 to the center of the other PD 42 which two PD 42 are arranged in x-direction), namely pitch.

Upon receiving supply of video signal, the transfer period setting circuit 24 adjusts the period to be supplied to the CCD driving circuit 22 (described hereinafter) correspondingly to the position of an image signal of the product 11 in the video signal of one field.

Upon receiving supply of the re-start signal, the CCD driving circuit 22 supplies a rest signal to the CCD 21 as shown in FIG. 4 in order to discharge electric charge accumulated in the CCD 21. Upon receiving supply of the reset signal namely substrate application pulse, the CCD 21 operates electronic shutter operation and discharges the accumulated electric charge to a substrate.

Next, in the step S3, the CCD driving circuit 22 generates, for example, a four-phase driving signals V1 to V4 shown in FIG. 4 periodically based on the supplied period, and supplies it to the CCD 21. If the voltage of the driving signals V1 to V4 is VH, electric charge moves from the PD 42 to the vertical CCD 41.

In this embodiment, the CCD 21 is an interline transfer type CCD, and provided with the prescribed number of PD 42 which is served as a photoelectric transducer and the vertical CCD 41 which is served for transferring electric charge generated by the PD 42 in the x-direction as shown in FIG. 5. For the purpose of simple description, FIG. 5 includes only partial structure of the CCD 21, however actually, other vertical CCD, PD, and horizontal CCD for transferring electric charge transferred from the vertical CCD in the y-direction and for outputting it to the signal processing circuit 23 are provided.

When four-phase driving signals V1 to V4 are applied, electric charge (or even-numbered) of odd-numbered PD out of PD 42 is transferred to the vertical CCD 41 in response to the voltage of the driving signal V1 at the time t1 (time t3, time t5). At the time t2 (time t4), electric charge of the residual even-numbered PD (or odd-numbered) out of the PD 42 is transferred to the vertical CCD 41 in response to the voltage of the driving signal V3.

The four-phase driving signal is set so as to have a phase difference of a prescribed interval, therefore, the potential well generated in the vertical CCD 41 moves in the x-direction at the same speed as the transferring speed of the image of the above-mentioned product 11.

Accordingly, as shown in FIGS. 5A to 5 E, the electric charge corresponding to a certain portion of the image of the product 11 is transferred to the same potential well. The electric charge corresponding to a static object is transferred to another potential well, the static object does not cause a problem because a good image of the transferring product 11 is obtained though the image of the static object can be blurred.

The voltage of the driving signals V1 and V3 is changed to VH frequently correspondingly to exposure time required for picking up the image in order to accumulate electric charge of the PD 42 in the same potential well.

The required frequency x is calculated using the following equation.

$$x=b/T=(b\times f\times v)/(L\times p) \tag{3}$$

Herein, b represents the exposure time required for picking up an image and T represents the above-mentioned period.

Figure 6A:
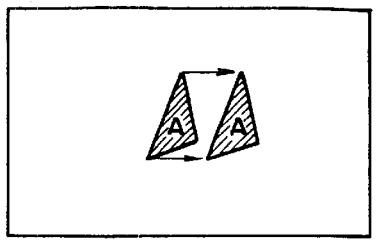
FIGS. 6A through 6D are diagrams for describing one example of an image picked up by the image Pickup system shown in FIG. 1.
Figure 6B:
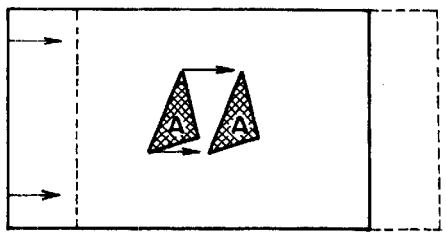
Figure 6C:
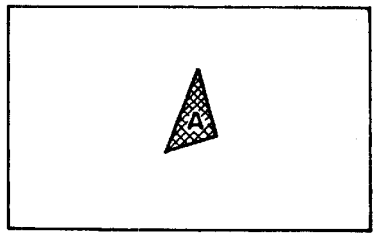

By operating as described herein above, for example, the product A shown in FIG. 6A is picked up as shown in FIGS. 6B and 6C without blurring as in the case of photographing by way of panning technique.

The electric charge generated during image pickup period shown in FIG. 4 as described herein above is outputted to the signal processing circuit 23 as the image signal during a signal output period through the vertical CCD 41 and horizontal CCD.

Further, in the step S4, the signal processing circuit 23 converts the image signal supplied from the CCD 21 to a video signal of a prescribed standard, and outputs the video signal to the image processing device 3 and transfer period setting circuit 24.

The image processing device 3 judges the condition of the product 11 using the video signal. Further, the transfer period setting circuit 24 adjusts the period of the driving signal as described hereinafter.

As described herein above, in this image pickup system, an image of the product 11 is picked up with suppressed blurring by setting the period of the driving signal of the CCD 21 correspondingly to the transferring speed of the product 11.

Next, operation of the transfer period setting circuit 24 for adjusting the period of the driving signal is described with reference to the flow chart shown in FIG. 7.

First, in the step S21, the variable T which represents the period of the driving signal of the CCD is substituted with the initial value T0 and the variable ΔT which represents the adjusting quantity of period is substituted with the prescribed initial value ΔT0, and the variable E' for showing the value of the image immediately preceding to the edge information E which represents the position of a prescribed side in the image of the product 11 in the x-direction is substituted with 0. The initial value T0 of the period is outputted first to the CCD driving circuit 22.

Next, in the step S22, the transfer period setting circuit 24 is waiting until the video signal is supplied from the signal processing circuit 23.

Upon receiving supply of the video signal, the transfer period setting circuit 24 detects the image of the product 11 from the video signal in the step S23, and calculates the value of the above-mentioned edge information E.

Next, in the step S24, the transfer period setting circuit 24 judges whether the absolute value |E–E'| of the difference between the value of edge information E and value of the variable E' (value of immediately preceding edge information) does not exceed a prescribed reference value e, and if |E–E'|≦e, the sequence proceeds to the step S28 without any adjustment of the period T, on the other hand, if not, the sequence proceeds to the step S25.

In the step S25, the transfer period setting circuit 24 judges whether the difference between (E–E') the value of edge information E and the value of variable E' is larger than the prescribed reference value e, if (E–E')>e, the period T is reduced by ΔT in the step S26.

On the other hand, if the judgement is not (E–E')>e, namely (E–E')<–e, in the step S35, then the transfer period setting circuit 24 sets the value of adjusting quantity ΔT to –ΔT, and thereafter reduce the period T by ΔT in the step S27.

In the step S28, the transfer period setting circuit 24 substitutes the variable E' with the value of the edge information E, thereafter the sequence returns to the step S22, and the transfer period setting circuit 24 waits for supply of the next video signal.

As described herein above, the transfer period setting circuit 24 adjusts the period T of the driving signal properly corresponding to the video signal supplied from the signal processing circuit 23 namely the image pickup position of the product 11. By adjusting the period T as described herein above, even if transferring speed of the product 11 is changed, a good image can be picked up.

Figure 8A:
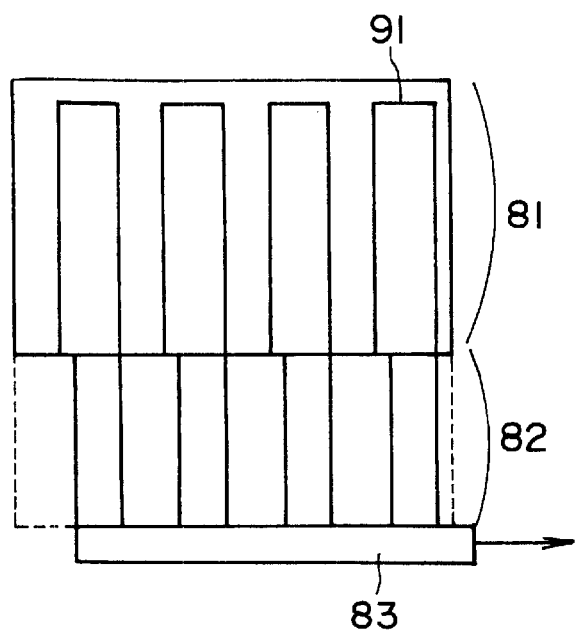
FIGS. 8A and 8B are diagrams for describing examples of a frame transfer type and frame interline transfer type CCD.
Figure 8B:
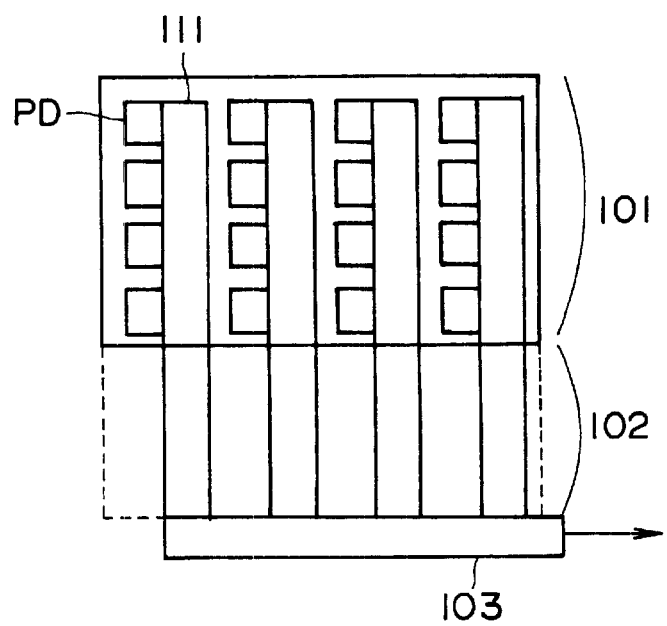

An interline transfer type CCD is used in the above-mentioned CCD 21 as shown in FIG. 5, however, a frame transfer type CCD shown in FIG. 8A or frame interline transfer type CCD shown in FIG. 8B may be used.

In the case that a frame transfer type CCD shown in FIG. 8A is used, because the vertical CCD 91 of the reception section 81 has a photodiode, it is not required that the driving signal is generated in consideration of transfer of electric charge from the photodiode S2 differently from the above-mentioned interline transfer type CCD.

In the case that a frame transfer type CCD shown in FIG. 8A or frame interline transfer type CCD shown in FIG. 8B is used, because electric charge for one field can be accumulated in the accumulation section 82 or 102, electric charge, namely a picked-up image, can be outputted in field unit.

Figure 9:
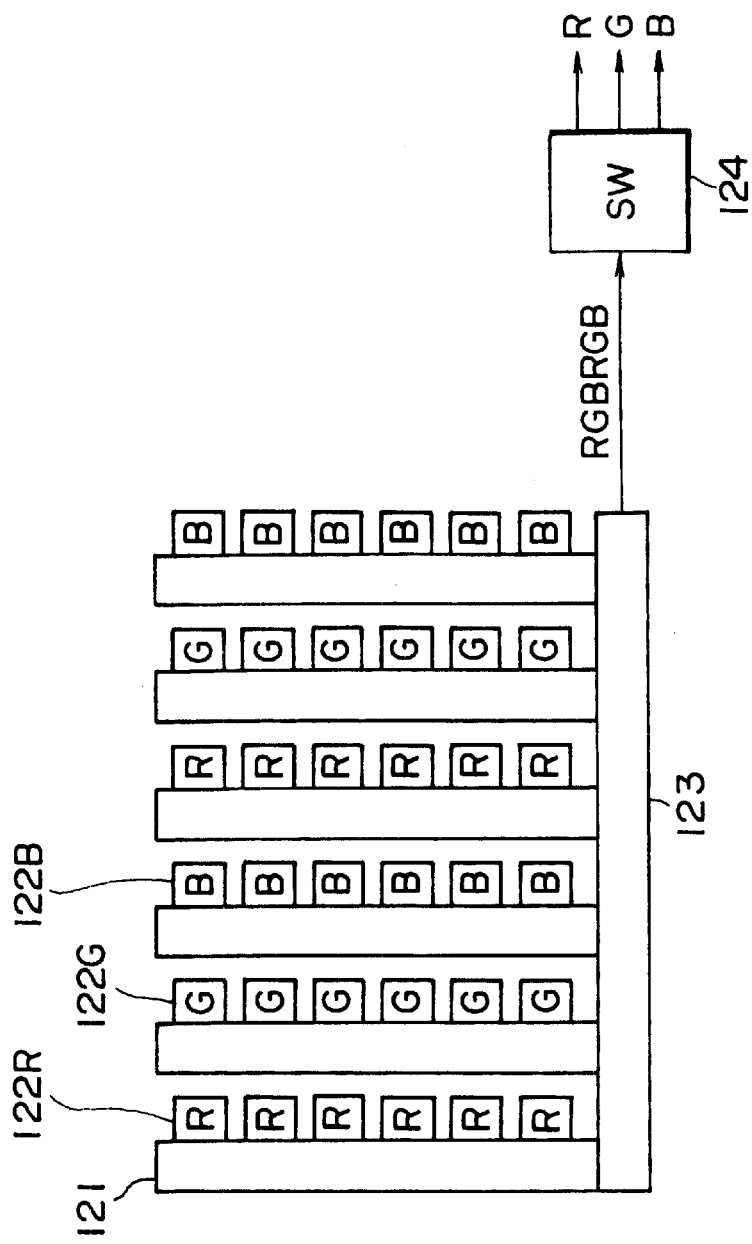
FIG. 9 is a block diagram for illustrating one example of the CCD for outputting RGB signals.

Because the above-mentioned CCD 21 outputs electric charge corresponding to the quantity of incident light, though the picked-up image is a monochrome image, color filters are provided and, for example as shown in FIG. 9, photodiodes corresponding respectively to red, green, and blue colors are provided, thereby, the image of the product 11 can be picked up as a RGB image.

The CCD shown in FIG. 9 is provided with prescribed color filters (not shown in the drawing), and a photodiode is allocated alternately to any of the red PD 122R, green PD 122G, and blue PD 122B for every vertical CCD 121. The electric charge generated from each PD is outputted to the horizontal CCD 123 through the vertical CCD 121, and outputted to the switch 124. The switch 124 divides electric charge corresponding to the supplied RGB into the R signal, G signal, and B signal, and outputs these signals to the subsequent circuit.

Figure 10:
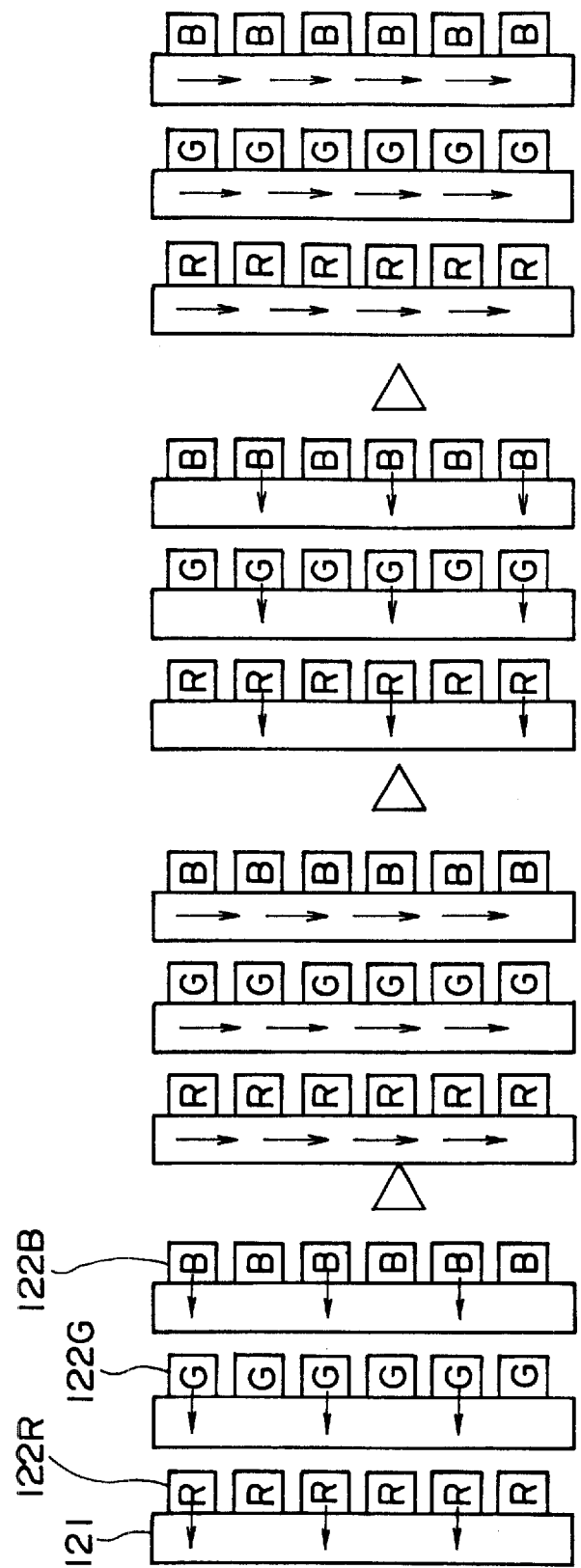
FIG. 10 is a diagram for describing operation of the CCD shown in FIG. 9.

FIG. 10 shows one example of operations of the CCD shown in FIG. 9. First, electric charge generated in the odd-numbered or even-numbered PD 122R, 122G, and 122B is transferred to the vertical CCD 121 (diagram at the left end), and is transferred on the vertical CCD 121 at the same speed as the transferring speed of the product 11 (second diagram from the left). Further, electric charge generated in the residual PD 122R, 122G, and 122B is transferred to the vertical CCD 121 at the prescribed timing (third diagram from the left), and is transferred on the vertical CCD 121 at the same speed as the transferring speed of the product 11 (fourth diagram from the left).

By operating as described herein above, because electric charge corresponding to an image of a prescribed color of the same portion on the product 11 is accumulated in the well of the same potential as in the case of the above-mentioned CCD 21, an RGB image of the product 11 can be picked up with suppressed blurring correspondingly to the transferring speed of the product 11.

Figure 11:
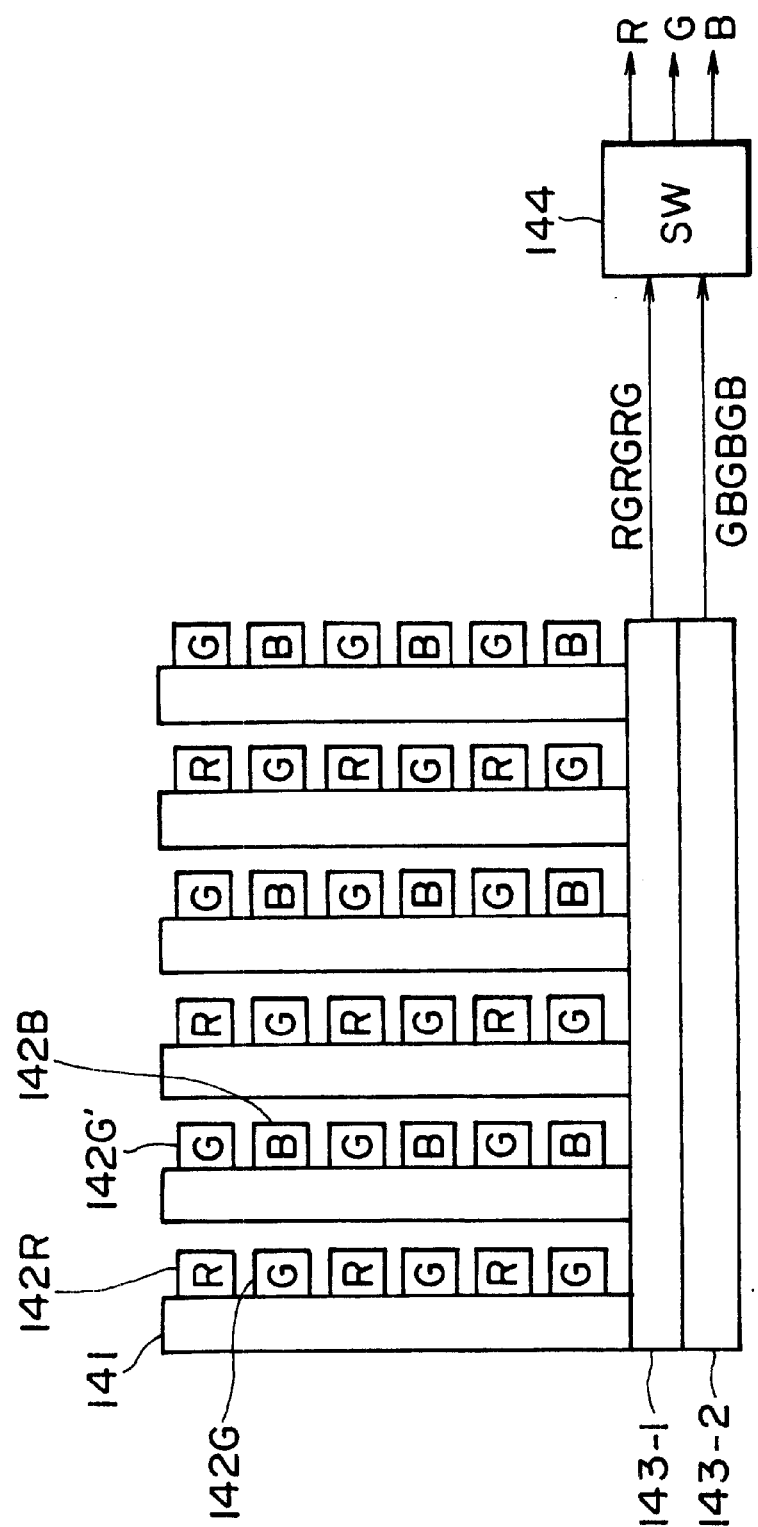
FIG. 11 is a diagram for describing another example of the CCD for outputting RGB signals.

FIG. 11 shows one example of the structure of CCD for RGB having vertical CCD of doubled number of steps and two horizontal CCD.

In the CCD shown in FIG. 11, color filters disposed in so-called Bayer arrangement (not shown in the drawing) are provided, photodiodes are allocated alternately to red PD 142R and green PD 142G, or greed PD 142G' and blue PD 142B for every vertical CCD 141. The electric charge generated in the red PD 142R and green PD 142G is outputted to the horizontal CCD 142-1 through the vertical CCD 141, further, outputted to the switch 144. on the other hand, electric charge generated in the green PD 142G' and blue PD 142B is outputted to the horizontal CCD 143-2 through the vertical CCD 141 and further outputted to the switch 144.

The switch 144 divides electric charge corresponding to the supplied RGB image into the R signal, G signal, and B signal, and outputs these signals to the subsequent circuit.

Figure 12:
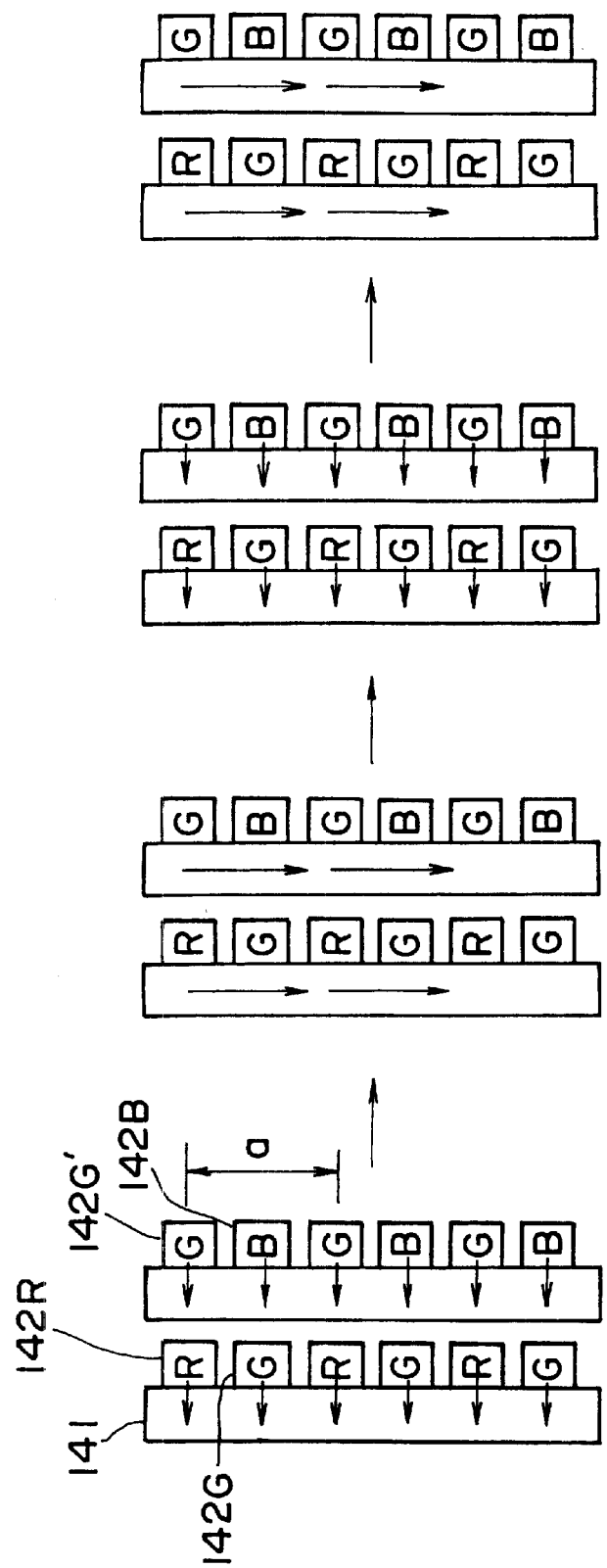
FIG. 12 is a diagram for describing operation of the CCD shown in FIG. 11.

FIG. 12 shows one example of operations of the CCD shown in FIG. 11. First, electric charge generated in all the PD 142R, 142G, 142G', and 142B is transferred to the vertical CCD 141 (diagram at the left end), and further transferred on the vertical CCD 141 at the same speed as the transferring speed of the product 11 (two pixels per one period, at the speed transferring by =j (¥1) in the drawing) (second diagram from the left). Again, electric charge generated in all the PD 142R, 142G, 142G', and 142B is transferred to the vertical CCD 141 at the prescribed timing (third diagram from the left), and is transferred on the vertical CCD 141 at the same speed as the transferring speed of the product 11 (fourth diagram from the left).

By operating as described herein above, an RGB image can be picked up under the condition of suppressed blurring correspondingly to the speed of the product 11 as in the case of the above-mentioned CCD 21. The CCD shown in FIG.

11 can pick up an image with a horizontal resolution 1.5 times better than the CCD shown in FIG. 9.

In the above-mentioned embodiment, an image of the product 11 on the belt conveyer 4 is picked up, however, an image of another object may be picked up.

In the above-mentioned embodiment, an object (product 11) to be picked up is transferred at a prescribed speed, alternatively, the image pickup device 1 is transferred at a prescribed speed and an image of an object is picked up in the same manner as the method used for picking up an image of a static object. That is, as long as the relative speed between the image pickup device 1 and the object to be picked up is kept in a prescribed speed, an image of the object can be picked up with suppressed blurring by way of the method described herein above.

Next, application examples of the above-mentioned image pickup system are described. FIG. 13 shows an exemplary structure of an image information supply system that the image pickup device 1 picks up a panorama image of the object surrounding the image pickup device 1 and the image is transmitted to respective users through a network, the representative network is Internet.

The image pickup device 1 is located on a rotatable table 201 so that the image pickup device 19 is rotatable. The image pickup device 1 is installed with the shaft 205 of the rotatable table 201 to extend through the principal point of the lens of the image pickup device 1 so that no parallax is caused with rotation. The image pickup device 1 is installed so that the vertical CCD41 shown in FIG. 5 is in parallel to the rotatable table 201, and the image pickup device 1 is structured so that an image of the object is picked up by way of panning technique as described hereinbefore. In other words, the image pickup device 1 is inclined by 90 degrees from the usual orientation.

The shaft 205 of the rotatable table 201 is rotated at a prescribed speed by means of a speed control motor 202 through a driving belt 204. A motor driver 203 drives the speed control motor 202. A panorama end point detection sensor 207 generates a detection signal (frame sync signal) when the rotatable table 201 (shaft 205) reaches a prescribed rotational position and outputs the detection signal to the image processing device 3. The image pickup device 1 is provided with built-in circuits shown in FIG. 2, a video signal outputted from the signal processing circuit 23 is supplied to the image processing device 3 through a rotary connector 206. The rotary connector 206 is served to output the output from the rotating image pickup device 1 to the fixed image processing device 3, for example, the rotary connector is structured with a slip ring. A battery is used as the power source of the image pickup device 1, in the case that only the video signal is transmitted to the image processing device 3, a radio transmission device and reception device may be provided respectively to the image pickup device 1 and image processing device 3 instead of the rotary connector 206.

The image processing device 3 generates a panorama image surrounding the image pickup device 1, and outputs it to the Internet server 221.

Upon receiving a request from a client 241 through the Internet 231, the Internet server 221 transmits the panorama image supplied from the image processing device 3 to the client through the Internet. The client 241 displays the image supplied from the Internet server 221 on a display 242.

The image processing device 3 has an effective region extraction processing section 251 as shown in FIG. 14. To the effective region extraction processing section 251, a video signal (image data) outputted from the image pickup device 1 is supplied through the rotary connector 206 and also a speed information (information on rotation speed of the image pickup device 1) is supplied from the motor driver 203. The effective region extraction processing section 251 stores the supplied image data and speed information in a buffer memory 252. Further, the effective region extraction processing section 251 extracts the effective region from the image data stored in the buffer memory 252, and supplies the image data of the effective region to the inversion processing section 253. The inversion processing section 253 rotates the image data of the input effective region, and then outputs it to a synthesis processing section 254.

The synthesis processing section 254 synthesizes a continuous one image from the image data of the effective region out of images which the image pickup device 1 picked up at different timing by way of storing the image data supplied from the inversion processing section 253 in a prescribed address in the built-in frame memory 255 synchronously with the frame sync signal outputted from the panorama end point detection sensor 207.

Herein, the conversion processing section 253 and synthesis processing section 254 may be positioned inversely. In other words, an image data obtained after synthesis processing may be inverted.

The Internet server 221 stores the image data of the panorama image supplied from the synthesis processing section 254 of the image processing device 3 in the memory 262A of the image cutting processing section 261 as shown in FIG. 15. The image cutting processing section 261 reads the image data corresponding to the azimuth from the memory 262A when a prescribed azimuth information of the panorama image is inputted from the client 241 through the network interface 265, and outputs it to an electronic zoom processing section 263.

The electronic zoom processing section 263 performs electronic zoom processing (processing for enlarging or reducing) on the image data supplied from the image cutting processing section 261 correspondingly to the zoom information when the zoom information is supplied from the client 241 through the network interface 265. The image compression section 264 compresses the image data supplied from the electronic zoom processing section 263 by way of a prescribed system such as MPEG or JPEG system, and outputs the compressed image data to the client 241 through the network interface 265.

The client 241 has an input device such as keyboard and mouse as shown in FIG. 16, and accepts indications from a user. Upon receiving an input of request for transmission of the image data from a user, the input device 274 outputs the corresponding request to the network interface 273, and outputs the information of azimuth and range (angle of view) wanted to be supplied out of the panorama image to an azimuth information zoom information control section 271 when these information is inputted. The azimuth information zoom information control section 271 stores the azimuth information and view angle information (zoom information) supplied from the input device 274 in the built-in memory 272, and outputs them to the network interface 273.

Upon receiving the input of request for transmission of the image data to the Internet server 221 from the input device 274, the network interface 273 receives supply of the azimuth information and zoom information from the control section 271, combines these information, and transmits the combined information to the Internet server 221 through the Internet. Further, upon receiving supply of the image data from the Internet server 221 through the Internet 231, the network interface 273 outputs it to a display 242 for displaying.

Figure 17:
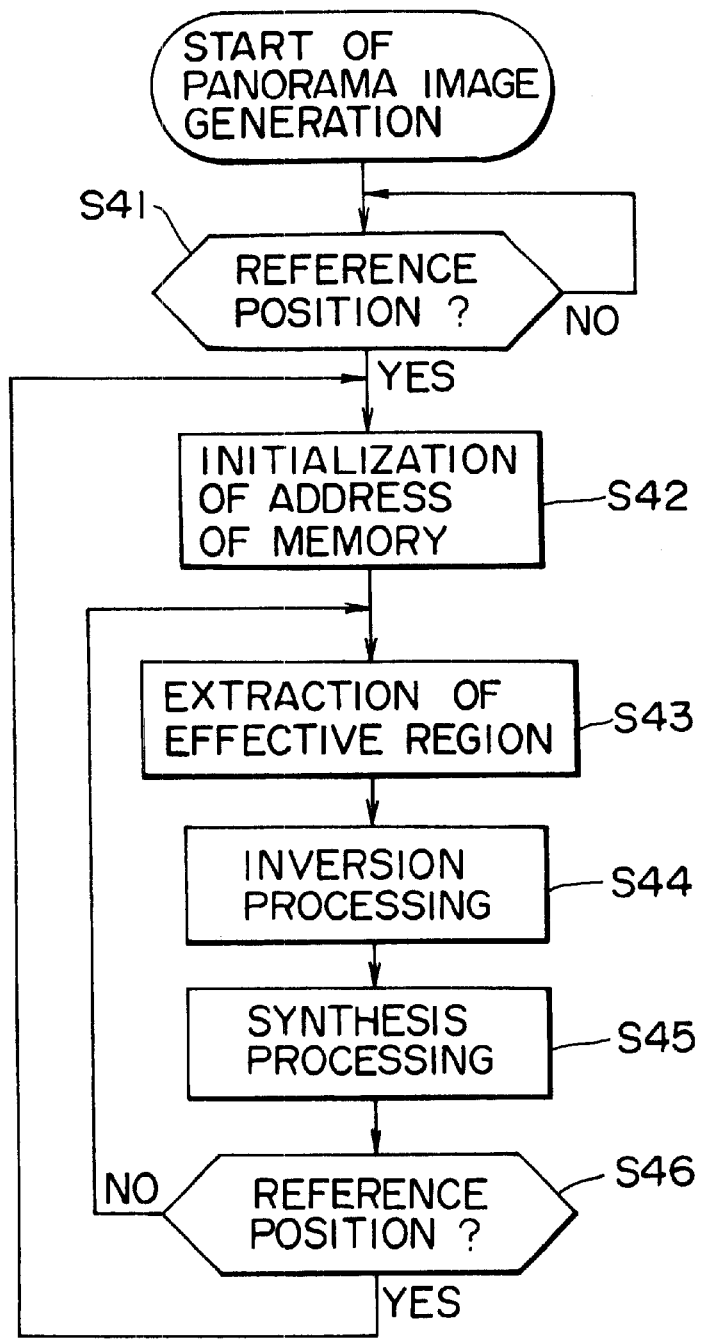
FIG. 17 is a flow chart for describing panorama image generation processing of the image processing device shown in FIG. 14.

Next, operations are described. The image processing device 3 extracts the panorama image surrounding the image pickup device 1 through the image pickup device 1, and supplies it continuously to the Internet server 221. First, this operation is described with reference to the flow chart shown in FIG. 17.

The motor driver 203 drives the speed control motor 202 at a prescribed seed. The rotation is transmitted to the rotatable table 201 which is connected to the shaft 205 through the driving belt 204. The image pickup device picks up an image of the surroundings by way of panning technique with rotation of the rotatable table 201. The image data obtained as the result of panning pickup is subjected to processing so that no blurring occurs on the image as described herein above, and outputted.

In the step S41, the effective region extraction processing section 251 and synthesis processing section 254 are waiting until the rotation position of the image pickup device 1 (rotatable table 201) reaches the prescribed reference position and a frame sync signal is outputted from the panorama end point detection sensor 207. When the panorama end point detection sensor 207 outputs the frame sync signal, the synthesis processing section 254 initializes the write address of the built-in frame memory 255 in the step S42. Further, the effective region extraction processing section 251 stores the image data supplied from the image pickup device 1 through the rotary connector 206 in the buffer memory 252, and starts extraction processing for extracting the effective region from the buffer memory 252.

Figure 18:
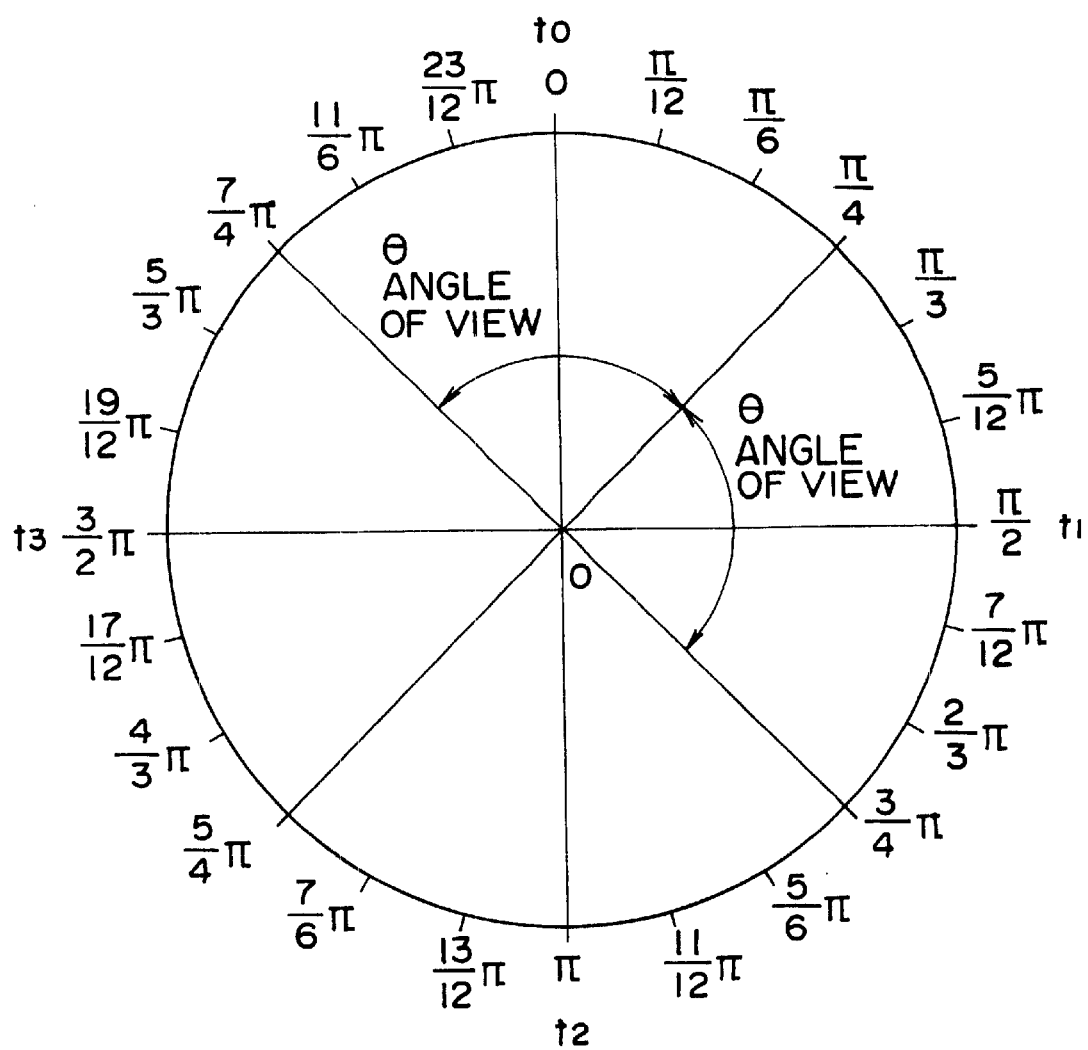
FIG. 18 is a diagram for describing extraction range of an image extracted by the image pickup device 1 shown in FIG. 13.

Herein, it is assumed that the angle of view $\theta$ of the lens of the image pickup device 1 is 90 degrees as shown in FIG. 18. For example, it is assumed that the lens of the image pickup device 1 is directed toward the reference direction (direction of 0 radian) at the time of 0, then the image in a range from $7\pi/4$ to $\pi/4$ is extracted. For example, it is assumed that the image pickup device 1 is rotated by angle $\phi$ (speed) during a time corresponding to one field and $\phi$ is $\pi/2$, then at the time t1 delayed from the time t0 by the time corresponding to one field, the image in a range from $\pi/4$ to $3\pi/4$ is extracted. Similarly, at the time t2 after the time corresponding to one field, the image in a range from $3\pi/4$ to $5\pi/4$ is extracted, and further at the time t3 after the time corresponding to one field, the image data in a range from $5\pi/4$ to $7\pi/4$ is extracted.

The CCD 21 of the image pickup device 1 is assumed to be an interline transfer type CCD as shown in FIG. 5, the image data is extracted every one field by the CCD 21.

Figure 19:
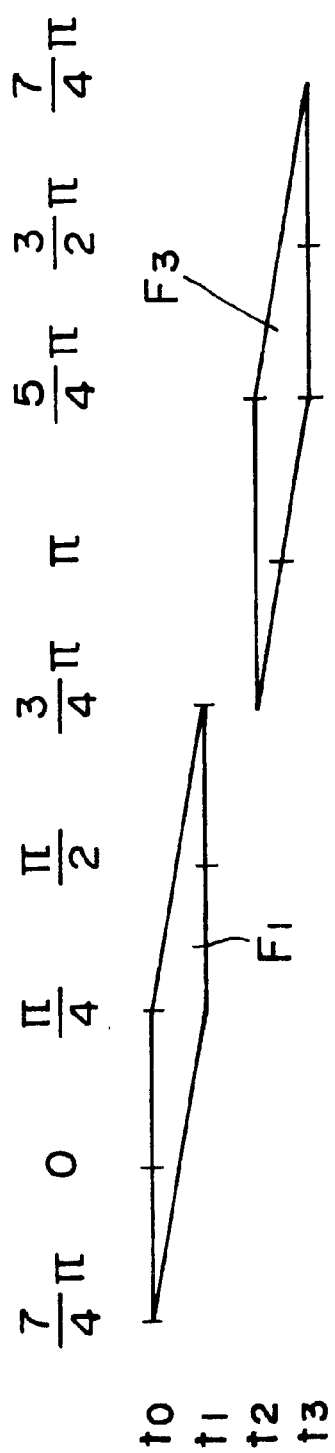
FIG. 19 is a diagram for describing extraction range of an image in the case that the image pickup device shown in FIG. 13 is rotated by $\pi/2$ per 1 field.

Accordingly, as shown in FIG. 19, for example, image pickup operation is performed during one field time from the time t0 to the time t1 to extract the image data of the field F1, and image pickup operation is not performed during the next one field time from the time t1 to the time t2, and the extracted image data is subjected to output processing during the time. During the next one field time from the time t2 to t3, image pickup operation is performed to obtain the image data of the field F3, and this image data is outputted during the next one field time from the time t3 to t4.

For the purpose of simple description, it is assumed that data of No. 1 image (image of one field) is obtained by performing exposure operation continuously during one field time. In this case, as shown in FIG. 19, images in every directions are not subjected to exposure continuously during one field time. Therefore, it is difficult to obtain an image of the same brightness as obtained by normal pickup.

Figure 20:
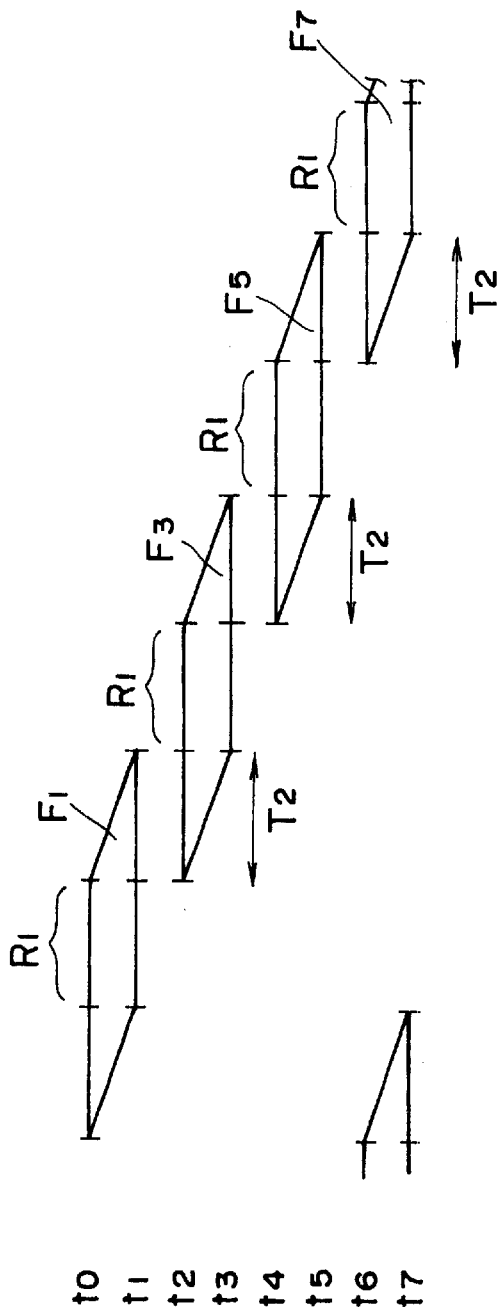
FIG. 20 is a diagram for describing extraction range of an image in the case that the image pickup device shown in FIG. 13 is rotated by $\pi/4$ per 1 field.

For example, it is assumed that the image pickup device 1 is rotated by $\pi/4$ during one field, then the image of the range R1 from 0 to $\pi/4$ out of image data of the field F1 extracted during one field from the time t0 to the time t1 is an image which is subjected to exposure continuously during one field as shown in FIG. 20. However, because image pickup operation is not operated during one field from the time t1 to t2, the image data of the range T2 from $\pi/4$ to $\pi/2$ is not subjected to exposure continuously during one field (image of insensitive region).

Similarly in the following, in the ranges R1 from $\pi/2$ to $3\pi/4$, from $\pi$ to $5\pi/4$, and from $3\pi/2$ to $7\pi/4$, the image is subjected to exposure during one field respectively, however, in the ranges T2 from $3\pi/4$ to $\pi$, from $5\pi/4$ to $3\pi/2$, and from $7\pi/4$ to 0, the image is not subjected continuously to exposure during one field respectively (image of insensitive region).

Figure 21:
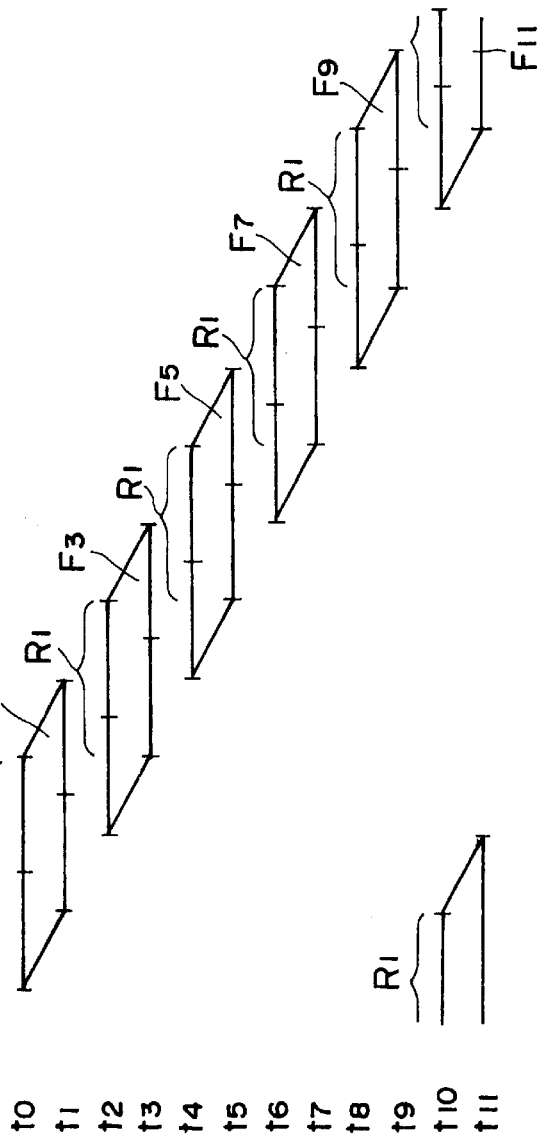
FIG. 21 is a diagram for describing extraction range of an image in the case that the image pickup device shown in FIG. 13 is rotated by $\pi/6$ per 1 field.

On the other hand, it is assumed that the image pickup device 1 is rotated by $\pi/6$ during one field as shown in FIG. 21, then in the range R1 from $23\pi/12$ to $\pi/4$ during one field from the time t0 to t1, exposure operation is performed continuously during one field. Image pickup operation is not performed during the next one field from the time t1 to t2, but during the next one field period from t2 to t3, the range R1 from $\pi/4$ to $7\pi/12$ is subjected to exposure continuously during one field. Similarly in the following, the range R1 from $7\pi/12$ to $11\pi/12$ is subjected to exposure continuously during one field period from the time t4 to t5, the range R1 from $11\pi/12$ to $5\pi/4$ is subjected to exposure continuously during one field period from the time t6 to t7, the range R1 from $5\pi/4$ to $19\pi/12$ is subjected to exposure continuously during one field period from the time t8 to t9, and the range from R1 from $19\pi/12$ to $23\pi/12$ is subjected to exposure continuously during one field period from the time t10 to t11.

In this case, a continuous image of the same brightness as obtained in the case that a static image pickup device 1 picks up an image of an object is obtained (though images of insensitive region where the sensitivity is lower in comparison with the image of the effective region, but images in all the directions can be used as the images of the effective region)

As described herein above, in the case that the angle of view $\theta$ is 90 degrees and rotation angle $\phi$ during one field period is $\pi/6$, the image data in $\frac{2}{3}$ region out of the image data obtained in each field is available as the image data in the effective region.

Assuming that ratio of the effective region for panning pickup to one field is af, then af is represented by the following equation.

$$af = 1 - \phi/\theta \qquad (4)$$

If the direction of panning pickup is upward direction, the vertical upward one field is effective, and if the direction of panning pickup is downward direction, the vertical downward one field is effective.

In detail, as shown in FIG. 21, in the case that the image pickup device 1 moves in the right direction in the drawing, for example, image data of an insensitive region located on the left side of the effective region R1 in the field F1 is image data outside the CCD 21 at the timing of the time t1, and only the image data of the insensitive region on the right side of the effective region R1 is picked up by the CCD 21.

The above-mentioned operation is described with reference to FIG. 6B. For example, it is assumed that the direction of arrows shown in FIG. 6B is set upward, then the image data of the upper insensitive region out of two upper and lower insensitive regions shown with a dashed line and solid line in the drawing is not covered by image pickup range of the CCD 21 shown with a solid line, and an insensitive region of the range shown below with a dashed line and solid line in the drawing is covered by the image pickup range of the CCD 21. In other words, image data of the effective region remains in the upper region of the CCD 21 in this case.

Figure 6D:
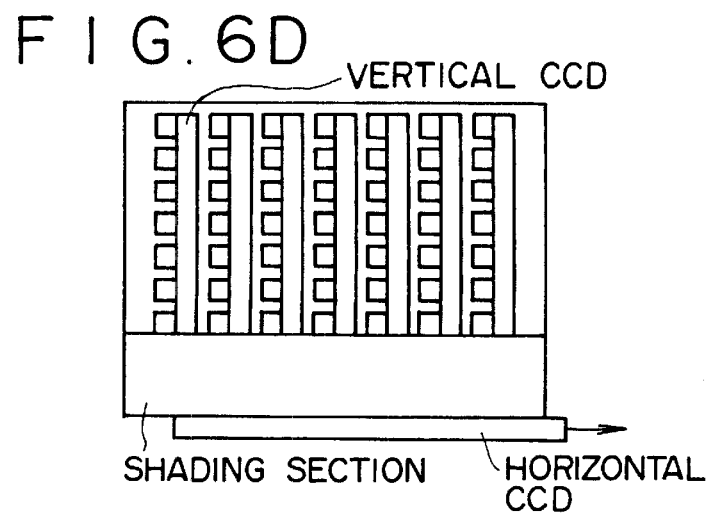

For example, if a CCD having a sufficiently large light shading section of the electric transfer section such as pseudo frame interline transfer type FIT-CCD as shown in FIG. 6D is used, the above-mentioned insensitive region outside the image pickup range is included in the CCD.

On the other hand, in the case that the arrows shown in FIG. 6B are set downward, the insensitive region of the range shown with a solid line and dashed line in the upper portion of the drawing remains in the image pickup range of the CCD 21, and the insensitive region shown with a solid line and dashed line in the lower portion of the drawing is not included in the image pickup range of the CCD 21. Therefore, in this case, the insensitive region is formed above the CCD 21 and the effective region is formed under the CCD 21.

It is assumed that the ratio of the region required for the image picked up using the image pickup device 1 to be continuous to form a panorama image to one field is a, then a is specified by rotation speed and exposure time, and in the case that the CCD 21 is an interline transfer type CCD, the effective field for panning image pickup comes once per two fields, accordingly a is represented by the following equation.

$$a = 2\phi/\theta \qquad (5)$$

On the other hand, in the case that the CCD 21 is a frame interline transfer type CCD, the effective field for panning image pickup includes all fields, accordingly a is represented by the following equation.

$$a = \phi/\theta \qquad (6)$$

a should be equal to or smaller than af, in the case that the CCD 21 is an interline transfer type CCD, the relation between the angle of view and rotation speed is defined by the following equation.

$$\phi \leq /\theta 3 \qquad (7)$$

On the other hand, in the case that the CCD 21 is a frame interline transfer type CCD, the relation is defined by the following equation.

$$\phi \leq \theta/2 \qquad (8)$$

The effective region extraction processing section 251 extracts selectively the range of a (range R1) out of the effective region of the effective field on the panning pickup image in the step S43.

In the case that the CCD 21 is an interline transfer type CCD, the image of the immediately preceding effective field is played back and outputted during an ineffective field to maintain the aspect ratio of the image.

The image data of the effective region outputted from the effective region extraction processing section 251 is supplied to the inversion processing section 253 and subjected to inversion processing in the step S44.

In detail, it is assumed that an image (object) shown in FIG. 22 is spread around the image pickup device 1. As described herein above, because the image pickup device 1 is installed with inclination angle of 90 degrees so that the original horizontal direction is maintained in parallel to the horizontal direction, the output image obtained by rotating the image pickup device 1, for example, every 90 degrees is shown in FIGS. 23A to 23D. On these images, the horizon stands in parallel to the vertical direction. The inversion processing section 253 is served to rotate the input image data by 90 degrees as described herein above so that the image rotated 90 degrees from the original position is changed to the same image as obtained without rotating the image pickup device 1 as shown in FIG. 22.

The image data inverted by the inversion processing section 253 is supplied to the synthesis processing section 254 for synthesis in the step S45. In detail, the synthesis processing section 254 stores the image data of, for example, the range A from π/6 to π/2 shown in FIG. 22 in the frame memory 255.

Next, the sequence proceeds to the step S46, whether the image reaches A reference position, that is, whether a frame sync signal is outputted from the panorama end point detection sensor 207 is judged, and if the result is NO, the sequence returns to the step S43, and following processing is repeated. The synthesis processing section 254 stores the image data of range B from π/2 to 5π/6 shown in FIG. 22 in the address subsequent to the image data of the range A in the frame memory 255 in the step S45 when the second processing is performed. Afterward the same processing is repeated, and the image of range C from 5π/6 to 7π/6, the image of range D from 7π/6 to 3π/2, and the image of range E from 3π/2 to 11π/6 are stored successively and continuously in the frame memory 255, and these images are synthesized to a panorama image. At the timing when the image data of range F1 from 11π/6 to 2π is stored in the frame memory 255, a frame sync signal is outputted, thereby reaching to the reference position is judged to be completed in the step S46, then the sequence returns to the step S42, the synthesis processing section 254 initializes the address of memory in the frame memory 255. As the result, the image data of range F2 from 0 to π/6 is written before range A in the frame memory 255.

The above-mentioned operation is repeated every one rotation of the image pickup device 1, the newest image data of the panorama image (dynamic image data) in the range from 0 to 2π is written in the frame memory 255.

The image data written in the frame memory 255 of the synthesis processing section 254 is read out and transmitted to the memory 262A of the image cutting processing section 261 of the Internet server 221, and stored. Hence, the panorama image data extracted by the image pickup device 1 is updated successively every one rotation of the image pickup device 1 and the updated image data is stored in the memory 262A of the Internet server 221. The image processing device 3 and the Internet server 221 may be combined in order to perform the transmission processing more quickly.

The client 241 takes an access to the Internet server 221, and receives supply of the panorama image data stored therein. In this case, the client 241 performs the processing as shown in the flow chart in FIG. 24. In response to the execution, the Internet server 221 performs the processing shown in FIG. 25. The processing performed by the client 241 and Internet server 221 is described combinedly.

First, in the step S61, the client who is a user operates the input device 274, and inputs a view direction (direction of an image to be supplied) and angle of view (range) out of the panorama image of the range from 0 to 2π. The data inputted from the input device 274 is supplied from the input device 274 to the azimuth information zoom information control section 271 and stored in the memory 272 in the step S62.

Further, the user operates the input device 274 to indicate an access to the Internet server 221, the indication is supplied to the network interface 273. The network interface 273 takes an access to the Internet server 221 through the Internet 231 in response to the indication in the step S63. Processing to connect between the user and the Internet server 221 is performed.

Upon receiving a request for connection through the network interface 273 of the client 241, the network interface 265 of the Internet server 221 performs processing to connect to the client 241 in response to the request in the step S91 in FIG. 25.

When the Internet server 221 is connected, the sequence proceeds to the step S64, the network interface 273 of the client 241 requests transmission of the image to the Internet server 221 and transmits simultaneously parameters which indicate the direction and angle of view of the image.

The request and parameters are received by the network interface 265 of the Internet server 221 in the step S92. The network interface 265 supplies the received direction information to the memory 262B of the image cutting processing section 261 and stores it in the step S93. The zoom information is transmitted to the memory 266 of the electronic zoom processing section 263 and stored. Upon completing the storing processing of the received direction and angle of view as described herein above, the network interface 265 performs processing to disconnect temporarily the connection with the client 241 in the step S94.

Correspondingly to the above-mentioned operation, the client 241 also performs processing to disconnect the connection with the Internet server 221 in the step S65.

Next, the image cutting processing section 261 of the Internet server 221 reads out the image data of the direction stored in the memory 262B from the memory 262A in the step S95, and supplies it to the electronic zoom processing section 263. The electronic zoom processing section 263 performs electronic zoom processing as required (enlarging or reducing processing) corresponding to the zoom information (angle of view information) stored in the memory 266 in the step S96, and outputs it to the image compression section 264. The image compression section 264 performs compression processing on the image data supplied from the electronic zoom processing section 263 in the step S97, and outputs it to the network interface 265.

The network interface 265 performs connection to the client 241 again in the step S98.

The network interface 273 of the client 241 is waiting for a request until the Internet server requests a connection in the step S66, and upon receiving the request, the network interface 273 performs again connection to the Internet server 221 in the step S67.

When connection is performed as described herein above, the network interface 265 of the Internet server 221 transmits the image data compressed by the image compression section 264 to the client 241 through the Internet 231 in the step S99.

The client 241 receives the image data from the Internet server 221 with the network interface 273 through Internet 231 in the step S68.

The interface 265 of the Internet server 221 performs processing to disconnect the connection in the step S100 after the network interface 265 transmits the image data to the client 241 in the step S99.

Correspondingly to the processing, in the client 241, the network interface 273 also performs processing to disconnect the connection in the step S69.

The network interface 273 of the client 241 expands the image data received in the step S70 and outputs it to a display for displaying. Hence, the image of the direction and angle of view which the user indicated by operating the input device 274 is transmitted to the Internet server 221 and displayed on the display 242.

Next, the sequence proceeds to the step S71, the client who is a user judges whether processing should be brought to an end, and if processing is not brought to an end, then the sequence proceeds to the step S72, the client judges whether direction or angle of view of the image to be transmitted should be changed. If no change is required, the sequence returns to the step S63, the network interface 273 performs processing to connect to the Internet server 221 again and receives supply of a new image data. Thereby, the user can monitor a dynamic image data picked up by means of the image pickup device 1 on the display 242.

If the judgement indicates that view direction or angle of view should be changed in the step S72, the sequence returns to the step S61, the user repeats again the following processing.

The judgment indicates that processing should be brought to an end in the step S71, the user operates the input device 274 to indicate the end of the processing.

As described herein above, by repeating operation for connection and operation for disconnection, the Internet server 221 can supply the image data to more users (clients).

Figure 26:
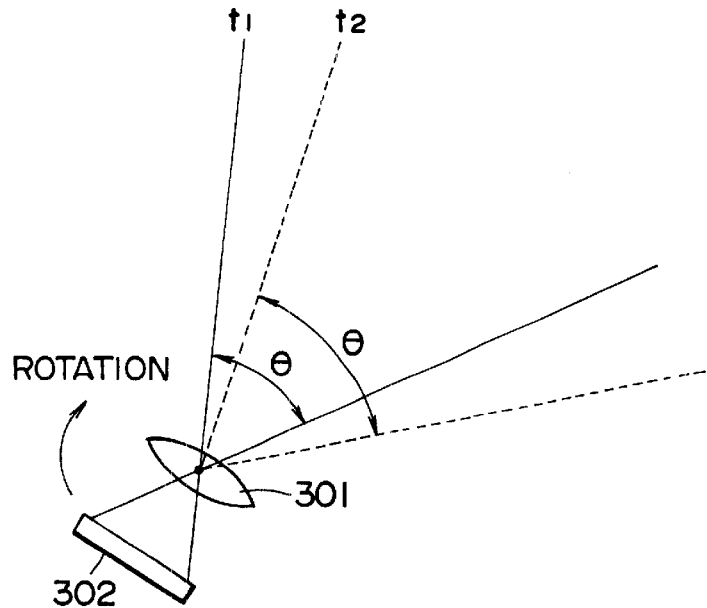
FIG. 26 is a diagram for describing image pickup range in the case that an image is extracted by rotating an image pickup device.
Figure 27:
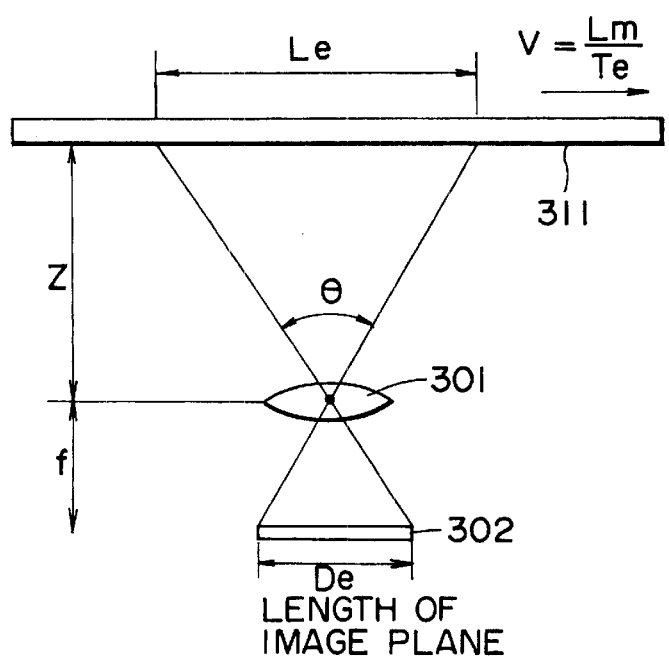
FIG. 27 is a diagram for illustrating a structure in the case that an image is extracted while an object is moved in parallel to the image pickup device.
Figure 30:
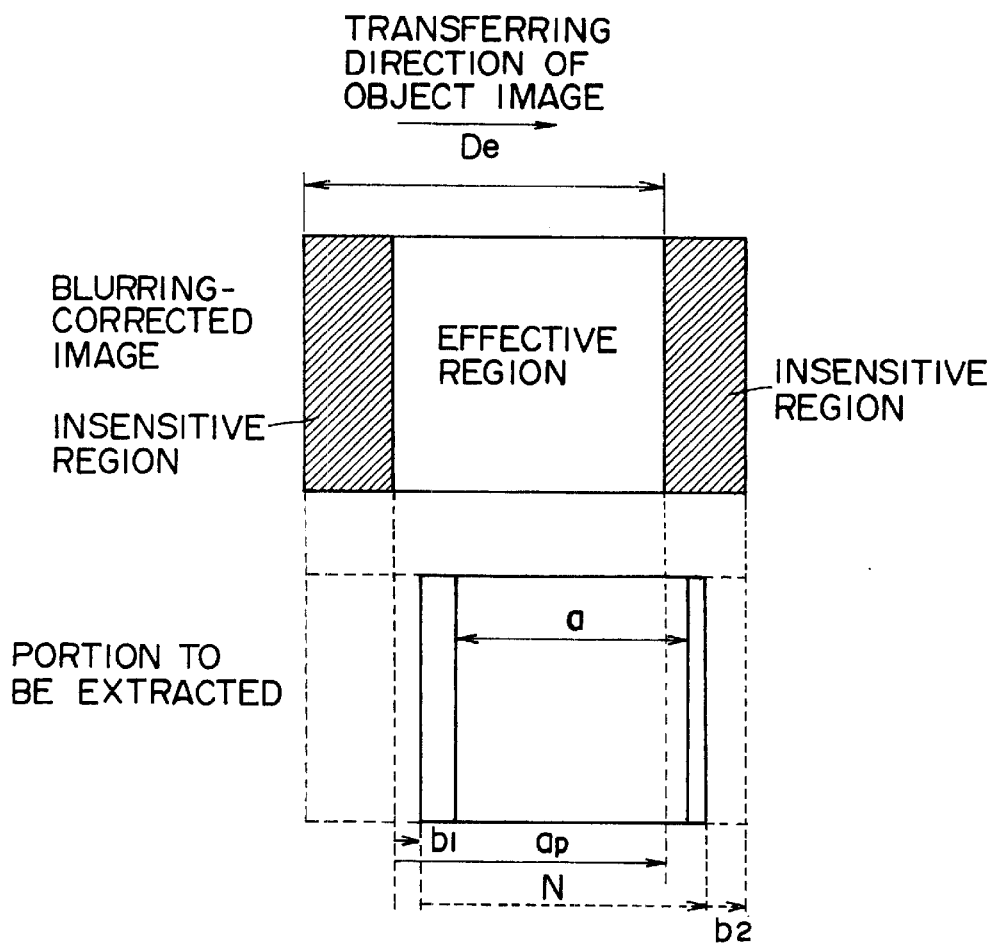
FIG. 30 is a diagram for describing operation of image extraction processing section and cutting processing section in the image processing device shown in FIG. 29.

In the above-mentioned operation, as shown in FIG. 26, by rotating the exposure section 302 and lens 301 of the built-in CCD 21 of the image pickup device 1 on the rotatable table 201, panning image pickup is carried out, however, in the case that the length of the object 311 is so long that the angle of view of the lens 301 is insufficient to pick up the image of the whole length at a time as shown in FIG. 27, by transferring the object 311 in parallel relatively to the image pickup device 1, the same processing can be performed. The problem in panning image pickup in which the image pickup device 1 is transferred relatively to the object 311 as shown in FIG. 27 is described generally as shown in FIG. 28.

In detail, when panning image pickup is carried out as described herein above, it is assumed that the length of view of the object (the length of the object 311 in the transferring direction which can be extracted by the lens 301 having a angle of view of θ) is Le as shown in FIG. 28A and the object 311 moves relatively to the right, the image of the region A is an image for frame-in later, and the image of the region B is an image for frame-out later though it is picked up first. Therefore, the image of the region A and region B is not subjected to exposure continuously during one field, and forms the insensitive region where the sensitivity is low in comparison with the image of the effective region between insensitive regions.

The sensitivity of the image of the effective region and insensitive region shown in FIG. 28A is described as shown in FIG. 28B. In detail, assuming that the sensitivity of the effective region is SP, the sensitivity of the insensitive regions A and B decreases from the SP value as shown in the drawing.

Various parameters are defined as described herein under.

Te: exposure time (sec)

Tf: time of one field (sec)

Le: length of the whole view in the synthesis direction of the camera (m)

De: length of pickup plane (m)

Lm: transfer distance of the object during the exposure time (m)

N: number of pixels of one screen for image extraction in the transferring direction of the object (pixel)

b1: number of pixels at the starting point for image extraction with reference to the beginning of the effective region. The transferring direction of the object is assigned as the positive direction (pixel)

b2: length of the object in the transferring direction of the portion which is not extracted subsequent to the end point of image extraction (number of pixels, pixel)

af: length of the object in the transferring direction of the effective region (number of pixels, pixel)

a: length of object in the transferring direction of the image required for obtaining a continuous panorama image (number of pixels)

nr: output rate of the image (one image is acquired every nr fields)(FLD)

Z: distance between a pickup plate and the principal point of the lens of the image pickup optical system (m)

f: focal length of the image pickup optical system (m)

RX: size of one pixel on the image pickup plane (m)

Lm, De, b1, b2, N, Te, Tf, Z, f, and nr are known parameters but Le and Rx are parameters to be derived from the following equations out of the above-mentioned parameters.

$$Le = (Z/f)De \quad (9)$$

$$Rx = De(/(N+b1+b2)) \quad (10)$$

The width of the region where the sensitivity is lowered due to motion blurring correction is considered to be equal to the range where the object 311 moves during the exposure time, then the length (number of pixels) ap of the effective region is represented by the following equation.

$$ap = (De - f \cdot Lm/Z)/Rx = N + b1 + b2 - f(N+b1+b2)Lm/Z \cdot De \quad (11)$$

The length of pixels (number of pixels) required to join the respective effective region images to complete a continuous image is represented by the following equation.

$$a = (f/Z) \cdot (LmnrTf/Te) \cdot (1/Rx) = (f/ZDe) \cdot (nrTf/Te)(N+b1+b2)Lm \quad (12)$$

In the case of the above-mentioned embodiment, only the effective region is extracted for synthesis. General condition for this case is shown herein under.

Processable condition is represented by the following equation.

$$a \leq af - b1 \quad (13)$$

Wherein, b1 in the above-mentioned equation is represented by the following equation.

$$b1 = \begin{cases} b1 & (b1 \geq 0) \\ 0 & (b1 < 0) \end{cases} \quad (14)$$

If $b1 \geq 0$, the condition of the above-mentioned equation is re-written as described in the following.

$$Lm \leq \frac{Te}{Te + nrTf} \cdot \frac{N + b2}{N + b1 + b2} \cdot \frac{Z}{f} \cdot De \quad (15)$$

If $b1 < 0$, the condition of the above-mentioned equation is re-written as described in the following.

$$Lm \leq \frac{Te}{Te + nrTf} \cdot \frac{Z}{f} \cdot De \quad (16)$$

In the case that the object 311 moves based on the above mentioned condition, the above-mentioned processing can be performed.

For example, in the case that b1=b2=0, Te=Tf, and nr=2, the condition specified by the above-mentioned equation (13) is derived as described herein under.

$$Lm \leq \frac{1}{3} \cdot \frac{Z}{f} \cdot De = \frac{1}{3} Le \quad (17)$$

The equation (17) means that a continuous image can be formed by synthesizing the effective region if the object 311 moves at a speed lower than 1/3 of the image to be extracted during the exposure time.

Though only the image data of the effective region is used to form a synthesized image in the above-mentioned case, alternatively it is possible to form a synthesized image by increasing the gain of the image data of the insensitive region. FIG. 29 shows an exemplary structure of the image processing device 3 for performing such processing.

In detail, in the image processing device 3 shown in FIG. 29, an image data obtained by panning image pickup using the image pickup device 1 is inputted to the image extraction processing device 321 and extracted. The image data extracted by the image extraction processing section 321 is inputted to the cutting processing section 322, and the image data on a prescribed region is cut out. The image data on the prescribed region cut out by the cutting processing section 322 is inputted to the sensitivity correction processing section 322, subjected to sensitivity correction, and then supplied to the synthesis processing section 254 to perform synthesis processing.

The image extraction processing section 321 extracts the N pixel range from the position b1 pixels apart from the left end of the effective region in the transferring direction of the object 311 (range to the position b2 pixels inside from the right end of the right side insensitive region). Herein, b1 is, for example, a data of an interval corresponding to a vertical retrace line interval, and corresponds substantially to the portion which does not constitute the image data, and b2 corresponds to the image data which is not extracted because of restriction due to the built-in memory capacity of the image extraction processing section 321.

The cutting processing section 322 cuts out the image data of the range length of a required to form one continuous panorama image from the image data of N pixel length extracted by the image extraction processing section 321.

The image data of the length a cut out by the cutting processing section 322 is supplied to the sensitivity correction processing section 323, and the image data contained in the insensitive region out of the image data range of the length a is subjected to sensitivity correction processing.

Figure 31:
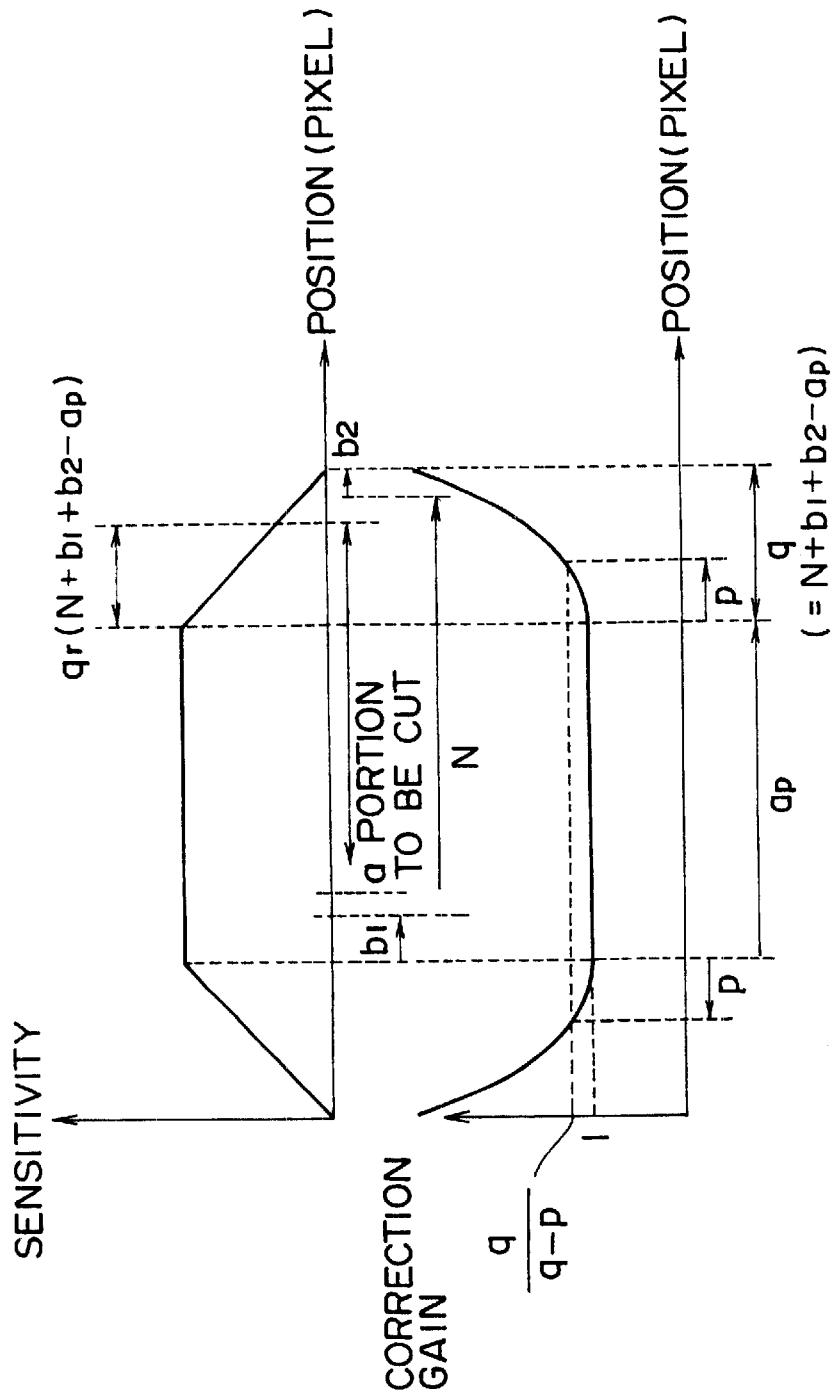
FIG. 31 is a diagram for describing operation of the sensitivity correction processing section shown in FIG. 29.

In detail, the sensitivity correction processing section 323 corrects the image data of the sensitivity characteristics as shown on the upper side in FIG. 31 with the gain as shown on the lower side in FIG. 31. As shown in the drawing, the gain of the image data of the effective region having the length of ap is 1, and on the other hand, the gain G of the pixels p obtained from the effective region of the image data of the insensitive region is set as it is represented by the following equation.

$$G = q/(q-p) \tag{18}$$

Wherein, q is represented by the following equation.

$$q = N + b1 + b2 - ap \tag{19}$$

As shown in FIG. 31, it is assumed that only the image data of a range defined by the ratio gr to the insensitive region having a length of q is cut out, the processable condition is represented by the following equation.

$$a \leq ap - b1 + gr(N+b1+b2-ap) \tag{20}$$

The equation is re-written to an equation for condition of Lm and the following equation is obtained if $b1 \geq 0$.

$$Lm \leq \frac{Te}{(1-gr)Te + nrTf} \cdot \frac{N+b2}{N+b1+b2} \cdot \frac{Z}{f} \cdot -De \tag{21}$$

If b1<0, the condition for Lm is represented by the following equation.

$$Lm \leq \frac{Te}{(1-gr)Te + nrTf} \cdot \frac{Z}{f} \cdot -De \tag{22}$$

For example, in the case that b1=b2=0, Te=Tf, and nr=2, if gr value comes nearer to 1, the above-mentioned condition approaches the following condition.

$$Lm \leq \frac{1}{2} \cdot \frac{Z}{f} \cdot -De = \frac{1}{2} Le \tag{23}$$

By correcting the gain as described herein above, the speed of the object can be increased in comparison with the case that only the effective portion is used, however, S/N ratio tends to be deteriorated because the gain at the edge of the screen rises high.

Figure 32:
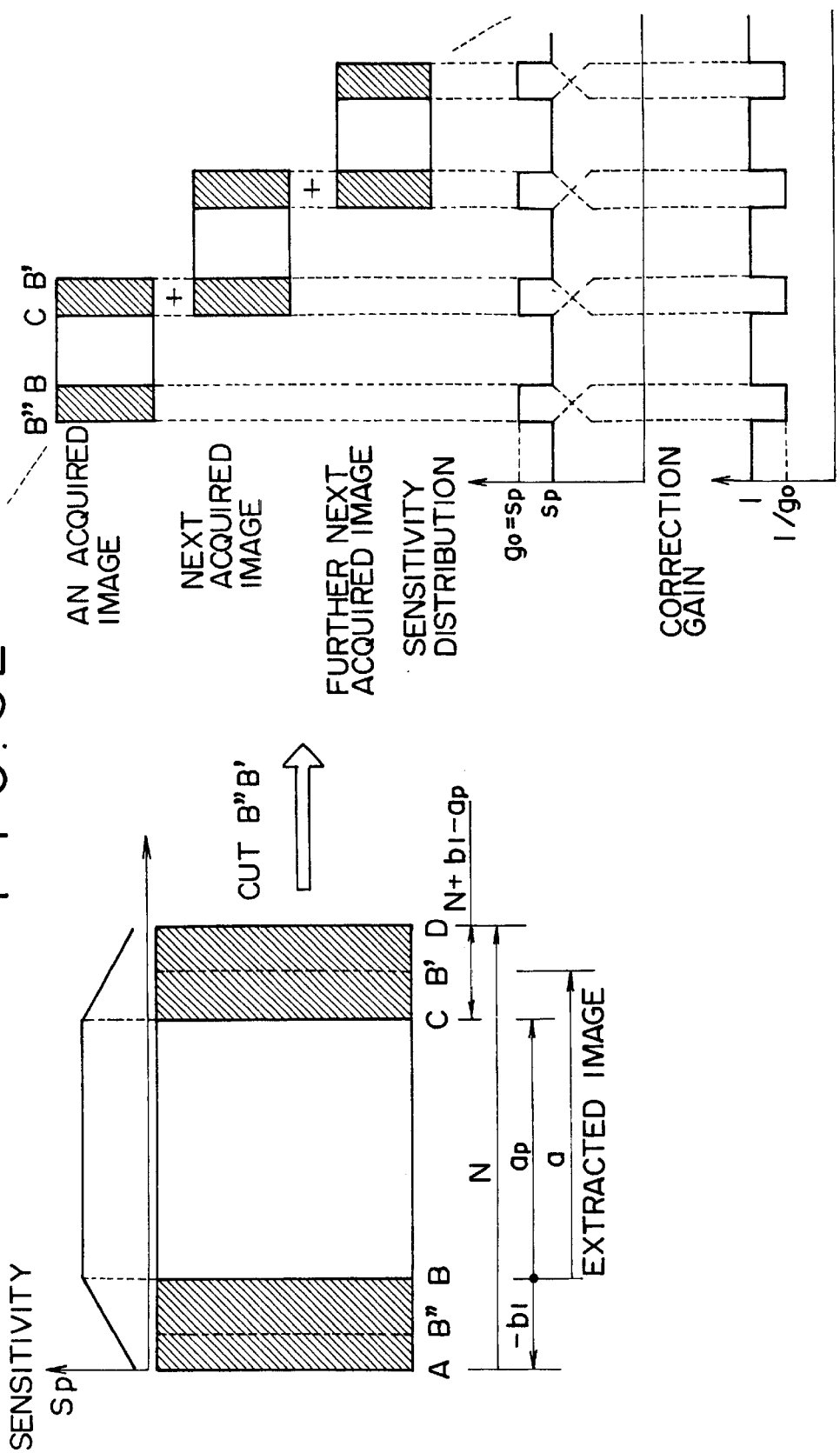
FIG. 32 is a diagram for describing sensitivity correction by way of overlapping of sensitivity correction processing section shown in FIG. 29.

Herein, for example, it is assumed that the right and left image insensitive regions can be extracted by means of the image extraction processing section 321 shown in FIG. 29 (in the case b1<0) as shown in FIG. 32 and the portion of the object located at the position B in the image of the prescribed field is located at the position B' on the next image. In this case, the position B is determined so that CB'=BB", and the cutting processing section 322 cuts out B" and B', the subsequent B"B is overlapped on the preceding CB' of the continuous acquired image to make a sum and to synthesize, thereby the low sensitivity of the insensitive region can be corrected.

The condition which enables such image processing involves that B' is located between C and D, and B" is located between A and B, and the condition is represented by the following equation.

$$a < ap + (N - ap + b1) \tag{24}$$

$$a - ap \leq -b1 \tag{25}$$

$$ap \leq a \tag{26}$$

The above-mentioned equation is solved for Lm to obtain the following equation.

$$\begin{cases} Lm \leq \dfrac{Te}{nrTf} \cdot \dfrac{N+b1}{N+b1+b2} \cdot \dfrac{Z}{f} \cdot -De \\ Lm \leq \dfrac{Te}{Te+nrTf} \cdot \dfrac{N+b2}{N+b1+b2} \cdot \dfrac{Z}{f} \cdot -De \\ Lm \geq \dfrac{Te}{Te+nrTf} \cdot \dfrac{Z}{f} \cdot -De \end{cases} \tag{27}$$

Lm which satisfies all of these is the condition. For example, in the case that b1=-N/3, b2=0, Te=Tf, and nr=2, the condition of Lm is represented by the following equation.

$$Le/3 \leq Lm \leq Le/2 \tag{28}$$

As shown in FIG. 32, when the insensitive regions of the image of the prescribed timing and of the image of the next timing are overlapped and the sum is calculated, the sensitivity of the summed insensitive region exceeds the sensitivity of the effective region. Assuming that the sensitivity of the effective region is Sp and the sensitivity of the portion of the summed overlap is g0·Sp, the following equation holds.

$$g0 = 1 + (q - a + ap)/q \tag{29}$$

Accordingly, the correction gain of 1/g0 on the overlap leads to the even sensitivity. In this case, the S/N ratio is not deteriorated because the correction gain is smaller than 1.

The sensitivity correction processing is performed in the sensitivity correction processing section 323 shown in FIG. 29 in this case.

Figure 33:
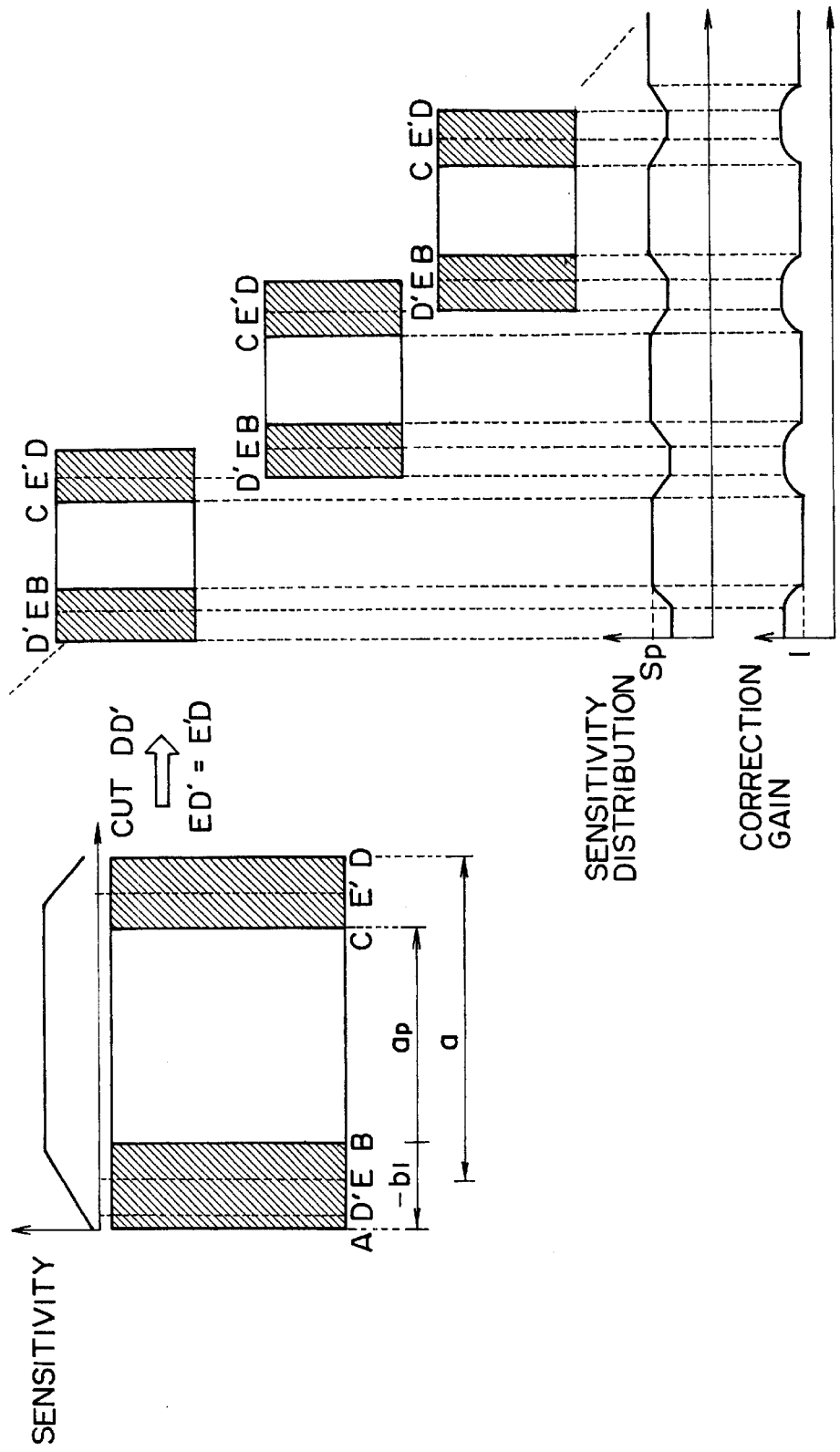
FIG. 33 is a diagram for describing sensitivity correction by way of combined gain-up and overlapping of the sensitivity correction processing section shown in FIG. 29.
Figure 34A:
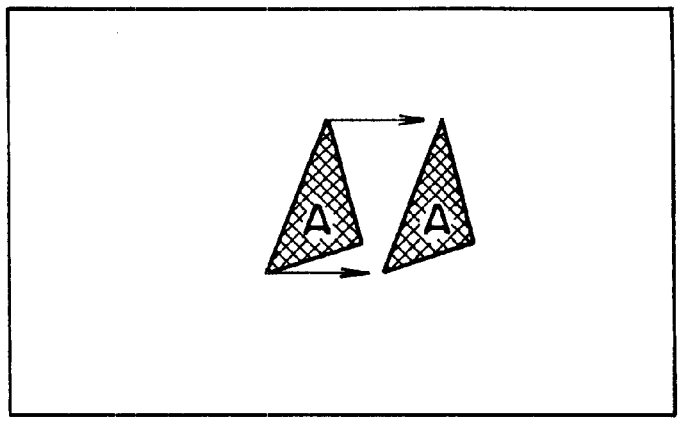
FIGS. 34A and 34B are diagrams for describing an example of blurring which happens during image pickup.
Figure 34B:
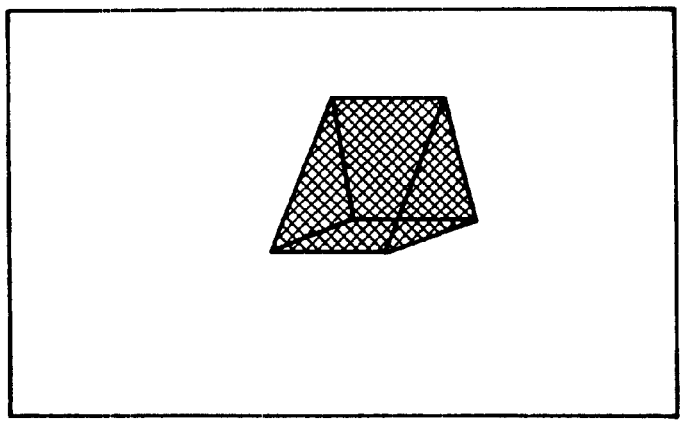

In the example of FIG. 32, it is assumed that overlapping does not reduce the sensitivity, however, the widened cut width in the cutting processing section 322 can result in some portions where the gain is not restored to the same level as the gain of the effective region in spite of overlapping as shown in FIG. 33. By using the combination of gain up and overlapping, the sensitivity can be restored.

In detail as shown in FIG. 33, in the case that the portion of the object located at the position E on a prescribed acquired image is located at the position E' on the next acquired image, if E'D≦AE, the position of D' is determined so that E'D=D'E, and D'D is cut out. If E'D>AE, the position of A' is determined so that AE=E'A', and AA' is cut out.

E'D of the preceding continuous acquired image and the subsequent D'E are overlapped to make a sum, and further the gain of the overlap is corrected to eliminate the difference from the sensitivity of the effective region. Thereby, the gain can be made even entirely.

By applying the method described hereinbefore, the image of a long object such as rails of rail ways and long webs can be picked up by transferring the object relatively to the image pickup device 1.

Recording mediums such as magnetic disk, CD-ROM, and solid memory, and communication media such as network and communication satellite are used as the transmission medium for transmitting the computer program used for processing as described hereinbefore to users.

As described hereinbefore, according to the image pickup device described in claim 1, image pickup method described in claim 5, transmission medium described in claim 6, and image pickup system described in claim 7, electric charge is outputted from the photoelectric conversion sections with the period calculated by dividing the distance interval of a plurality of photoelectric conversion sections arranged in a prescribed direction by the transferring speed in the prescribed direction of the projected image of the object on the plurality of photoelectric conversion sections, electric charge outputted from the plurality of photoelectric conversion sections is superimposed on the electric charge accumulated at the position corresponding to the photoelectric conversion section, and the electric charge outputted from the plurality of photoelectric conversion section is moved in the prescribed direction at the same speed as the transferring speed of the image of the object in the prescribed direction, thereby, blurring is prevented during image pickup without using a highly sensitive image pickup device and high illumination lighting system.

According to the image information providing device image information providing method and transmission medium image data of an object picked up at different timing are synthesized to form a synthesized image data, it is stored, and the image data of a range corresponding to a specified information is read out from the stored image data, and the image data is outputted, thereby, the image data of desired ranges are provided to a plurality of users.

According to the image data processing device image data processing method and transmission medium the effective region specified by the angle of view and speed is extracted out of the image data of the object picked up at a prescribed timing, the image data of the extracted effective region is synthesized and stored, thereby, the image of the object which can not be extracted at a time can be extracted simply and consistently.

According to the image data processing device image data processing method and transmission medium the sensitivity of the image data on the first region and second region is corrected, these image data are synthesized to form one image together with the image data on the third region and image data on the fourth region, thereby, the image of the object which can not be extracted at a time can be extracted simply and consistently.

What is claimed is:

1. An image pickup device for picking up an object transferring relatively to a prescribed direction provided with:
   a plurality of photoelectric conversion means arranged in said prescribed direction for converting the incident light photoelectrically to generate electric charge;
   electric charge transfer means for superimposing said electric charge outputted from said photoelectric conversion means on electric charge accumulated at the position corresponding to the photoelectric conversion means, and for transferring the electric charge in said prescribed direction at the same speed as the transferring speed in said prescribed direction of the image of said object projected on said photoelectric conversion means;
   driving means for outputting said electric charge from said photoelectric conversion means to said electric charge transfer means at a prescribed number of times with a period calculated by dividing the distance interval of said plurality of photoelectric conversion means by the transferring speed in said prescribed direction of the image of said object; and
   processing means for processing electric charge transferred from said electric charge transfer means.

2. The image pickup device as claimed in claim 1, wherein said prescribed number of times is a number of times obtained by dividing the exposure time required to pick up said object by said period.

3. The image pickup device as claimed in claim 1, wherein said image pickup device is provided with charge-coupled devices as said photoelectric conversion means and said electric charge transfer means.

4. The image pickup device as claimed in claim 3, wherein said charge-coupled device is any one of interline transfer type, frame transfer type, and frame interline transfer type charge-coupled devices.

5. An image pickup method for picking up an object transferring relatively to a prescribed direction comprising the steps of:
   superimposing said electric charge outputted from said photoelectric conversion means on electric charge accumulated at the position corresponding to the photoelectric conversion means, and transferring the electric charge in said prescribed direction at the same speed as the transferring speed in said prescribed direction of the image of said object projected on said photoelectric conversion means;
   outputting said electric charge from said photoelectric conversion means to said electric charge transfer means at a prescribed number of times with a period calculated by dividing the distance interval of said plurality of photoelectric conversion means by the transferring speed in said prescribed direction of the image of said object; and
   processing electric charge transferred from said electric charge transfer means.

6. A storage medium which stores a computer program used for an image pickup device for picking up an object transferring relatively to a prescribed direction comprising the steps of:
   superimposing said electric charge outputted from said photoelectric conversion means on electric charge accumulated at the position corresponding to the photoelectric conversion means, and transferring the electric charge in said prescribed direction at the same speed as the transferring speed in said prescribed direction of the image of said object projected on said photoelectric conversion means;
   outputting said electric charge from said photoelectric conversion means to said electric charge transfer means at a prescribed number of times with a period calculated by dividing the distance interval of said plurality of photoelectric conversion means by the transferring speed in said prescribed direction of the image of said object; and
   processing electric charge transferred from said electric charge transfer means to be processed.

7. An image pickup system provided with:
   transfer means for transferring an object in a prescribed direction;
   detection means for detecting the position of said object;
   a plurality of photoelectric conversion means arranged in said prescribed direction for converting the incident light photoelectrically to generate electric charge;
   electric charge transfer means for superimposing said electric charge outputted from said photoelectric con version means on electric charge accumulated at the position corresponding to the photoelectric conversion means, and for transferring the electric charge in said prescribed direction at the same speed as the transferring speed in said prescribed direction of the image of said object projected on said plurality of photoelectric conversion means;

driving means for outputting said electric charge from said photoelectric conversion means to said electric charge transfer means at a prescribed number of times with a period calculated by dividing the distance interval of said plurality of photoelectric conversion means by the transferring speed in said prescribed direction of the image of said object depending on the position of said object detected by means of said detection means;

the first processing means for processing electric charge transferred from said electric charge transfer means and generating an image signal, and the second processing means for processing the image signal generated by said first processing means.

* * * * *

UNITED STATES PATENT AND TRADEMARK OFFICE
CERTIFICATE OF CORRECTION

PATENT NO.    : 6,525,770 B1
DATED         : February 25, 2003
INVENTOR(S)   : Kazuhiko Ueda et al.

It is certified that error appears in the above-identified patent and that said Letters Patent is hereby corrected as shown below:

<u>Title page,</u>
Item [75], replace "Kuzuhiko" with -- Kazuhiko --

Signed and Sealed this

Twenty-eighth Day of October, 2003

JAMES E. ROGAN
*Director of the United States Patent and Trademark Office*